United States Patent
Cho

(10) Patent No.: US 10,009,421 B2
(45) Date of Patent: Jun. 26, 2018

(54) CONTENTS CONTROL IN ELECTRONIC DEVICE

(71) Applicant: Samsung Electronics Co., Ltd., Gyeonggi-do (KR)

(72) Inventor: Ik-Hwan Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 95 days.

(21) Appl. No.: 14/747,124

(22) Filed: Jun. 23, 2015

(65) Prior Publication Data
US 2016/0119418 A1    Apr. 28, 2016

(30) Foreign Application Priority Data

Oct. 22, 2014    (KR) ........................ 10-2014-0143433

(51) Int. Cl.
| | |
|---|---|
| *H04L 29/08* | (2006.01) |
| *H04L 29/06* | (2006.01) |
| *H04N 21/4722* | (2011.01) |
| *H04N 21/83* | (2011.01) |
| *H04W 4/00* | (2018.01) |

(52) U.S. Cl.
CPC ...... *H04L 67/1095* (2013.01); *H04L 65/4084* (2013.01); *H04L 65/602* (2013.01); *H04L 67/101* (2013.01); *H04L 67/104* (2013.01); *H04N 21/4722* (2013.01); *H04N 21/83* (2013.01); *H04W 4/008* (2013.01)

(58) Field of Classification Search
CPC ............... G06Q 30/02; G06Q 30/0267; G06Q 30/0244; G06Q 30/0245; G06Q 30/0269; G06Q 50/01; H04L 67/04; H04L 67/20; H04L 67/306; H04L 67/02; H04L 67/303; G06F 17/30905; H04W 4/008; H04W 4/023; H04W 4/206
See application file for complete search history.

(56) References Cited

U.S. PATENT DOCUMENTS

| | | | | |
|---|---|---|---|---|
| 7,606,562 B2 * | 10/2009 | Aaltonen | .......... | G06F 17/30905 455/412.1 |
| 8,081,954 B2 * | 12/2011 | Aaltonen | .......... | G06F 17/30905 455/412.1 |
| 8,179,872 B2 * | 5/2012 | Bienfait | .................. | H04W 8/18 370/338 |

(Continued)

FOREIGN PATENT DOCUMENTS

| | | |
|---|---|---|
| EP | 2 631 827 A1 | 8/2013 |
| KR | 10-2010-0029137 A | 3/2010 |

(Continued)

OTHER PUBLICATIONS

European Search Report dated Sep. 26, 2017.

*Primary Examiner* — Ninos Donabed
(74) *Attorney, Agent, or Firm* — Cha & Reiter, LLC

(57) ABSTRACT

Disclosed is an electronic device including a storage module that stores contents, and a content control module that transmits the contents to at least one other electronic device. The content control module may store log information in the storage module which is recorded in connection with access to the contents by the electronic device or the at least one other electronic device as attribute information (metadata) related to the contents.

22 Claims, 18 Drawing Sheets

(56) References Cited

U.S. PATENT DOCUMENTS

| | | | |
|---|---|---|---|
| 8,189,460 B2* | 5/2012 | Shaffer | H04L 47/10 370/229 |
| 2003/0182431 A1* | 9/2003 | Sturniolo | H04L 63/0272 709/227 |
| 2007/0124503 A1* | 5/2007 | Ramos | G06F 3/017 709/248 |
| 2008/0288310 A1* | 11/2008 | Aaltonen | G06Q 10/06375 705/14.42 |
| 2009/0061943 A1 | 3/2009 | Kamgaing-Kouam | |
| 2009/0099931 A1* | 4/2009 | Aaltonen | G06Q 30/0257 705/14.55 |
| 2009/0203389 A1 | 8/2009 | Bhat | |
| 2010/0071070 A1* | 3/2010 | Jawa | G06F 17/30861 726/26 |
| 2010/0189256 A1 | 7/2010 | Doehla et al. | |
| 2010/0191549 A1* | 7/2010 | Toyama | G06Q 10/02 705/5 |
| 2010/0198798 A1 | 8/2010 | Doehla et al. | |
| 2011/0019632 A1* | 1/2011 | Walker | H04M 1/72522 370/329 |
| 2011/0022669 A1* | 1/2011 | Pascoe | G06Q 30/02 709/206 |
| 2011/0093192 A1* | 4/2011 | Yang | G01C 21/362 701/408 |
| 2011/0113100 A1* | 5/2011 | Chawla | G06F 17/3087 709/205 |
| 2012/0137002 A1* | 5/2012 | Ferris | G06F 9/5072 709/226 |
| 2012/0191529 A1* | 7/2012 | Lewis | G06Q 30/0242 705/14.41 |
| 2012/0278395 A1* | 11/2012 | Garcia | G06Q 10/00 709/205 |
| 2012/0278410 A1* | 11/2012 | Chung | H04W 4/023 709/206 |
| 2013/0024577 A1* | 1/2013 | Krishnaswamy | G06Q 10/107 709/227 |
| 2013/0041491 A1* | 2/2013 | Itoyanagi | H04N 7/173 700/94 |
| 2013/0185354 A1* | 7/2013 | Seligstein | G06Q 50/01 709/204 |
| 2013/0254304 A1* | 9/2013 | Van Nest | H04L 67/04 709/206 |
| 2013/0290216 A1* | 10/2013 | Scheffler | G06Q 40/04 705/36 R |
| 2014/0020059 A1* | 1/2014 | Miyamoto | G06F 12/00 726/2 |
| 2014/0089413 A1* | 3/2014 | Evans | G06F 17/30017 709/204 |
| 2014/0115058 A1* | 4/2014 | Yin | H04W 4/023 709/204 |
| 2014/0122697 A1* | 5/2014 | Liu | G06F 17/30867 709/224 |
| 2014/0187209 A1* | 7/2014 | Kang | H04W 4/14 455/412.1 |
| 2014/0317191 A1* | 10/2014 | Schroeder | H04L 12/1813 709/204 |

FOREIGN PATENT DOCUMENTS

| | | |
|---|---|---|
| KR | 10-2010-0049648 A | 5/2010 |
| WO | 2014/038912 A1 | 3/2014 |
| WO | 2014/126335 A1 | 8/2014 |

* cited by examiner

CONTENTS CONTROL IN ELECTRONIC DEVICE

CLAIM OF PRIORITY

This application claims priority under 35 U.S.C. § 119(a) to Korean Application Serial No. 10-2014-0143433, which was filed in the Korean Intellectual Property Office on Oct. 22, 2014, the entire content of which is hereby incorporated by reference.

BACKGROUND

1. Technical Field

The present disclosure relates generally to an electronic device and a method for controlling contents by an electronic device.

2. Description of the Related Art

With the rapid development of information and telecommunication technology, electronic devices now serve as important means for transmitting various pieces of information to users. Electronic devices such as smartphones, tablet PCs and laptops reproduce contents such as music, photos, and videos through output devices based on each application. Further, the storage capacity of portable electronic devices has expanded, whereby devices provide convenience to users by providing a multitude of information. Electronic devices can also store information on the use of contents such as music, photos, and videos by the user as history information.

SUMMARY

According to existing technology, when history information of contents is stored according to each application, the history information can be identified only when the corresponding application is executed. Further, when contents are transmitted to an external electronic device such as a social networking site (SNS) or a web cloud, history information on the transmitted contents cannot be identified.

Various embodiments disclosed herein may solve these and other problems by providing an electronic device and a method for implementing a content control for conveniently identifying use logs or transmission logs of contents.

In accordance with an aspect of the present disclosure, an electronic device includes a storage module that stores contents, and a content control module configured to transmit the contents to at least one other electronic device. The content control module may store log information recorded in connection with access to the contents by the electronic device or the at least one other electronic device as attribute information (metadata) related to the contents.

In accordance with another aspect of the present disclosure, an electronic device includes a storage module that stores first contents, and a content control module configured to receive second contents from at least one other electronic device, and identify logs recorded in connection with access to the second contents by the at least one other electronic device using attribute information related to the second contents.

In accordance with another aspect of the present disclosure, an electronic device includes a storage module that stores contents received from at least one other electronic devices, and a content control module that stores log information recorded in connection with access to the contents by the electronic device or the at least one other electronic device as attribute information (metadata) related to the contents.

In accordance with another aspect of the present disclosure, a method of controlling contents by an electronic device is provided. The method includes: transmitting the contents to at leas one other electronic device; and storing log information recorded in connection with access to the contents by the electronic device or the at least one of the other electronic device as attribute information (metadata) related to the contents.

In accordance with another aspect of the present disclosure, a method of controlling contents by an electronic device is provided. The method includes: receiving contents from at least one other electronic device; and identifying logs recorded in connection with access to the contents by the at least one other electronic device using attribute information related to the contents.

In accordance with another aspect of the present disclosure, a method of controlling contents by an electronic device is provided. The method includes: receiving contents from at least one other electronic device; and storing log information recorded in connection with access to the contents by the electronic device or the at least one other electronic device as attribute information (metadata) related to the contents.

An electronic device and a method of controlling contents by an electronic device according to various embodiments can conveniently identify use or transmission logs of contents generated within or outside the electronic device. Further, it is possible to improve user convenience by providing a user with various pieces of information related to the use, editing or transmission of the contents through the use of the transmission logs.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
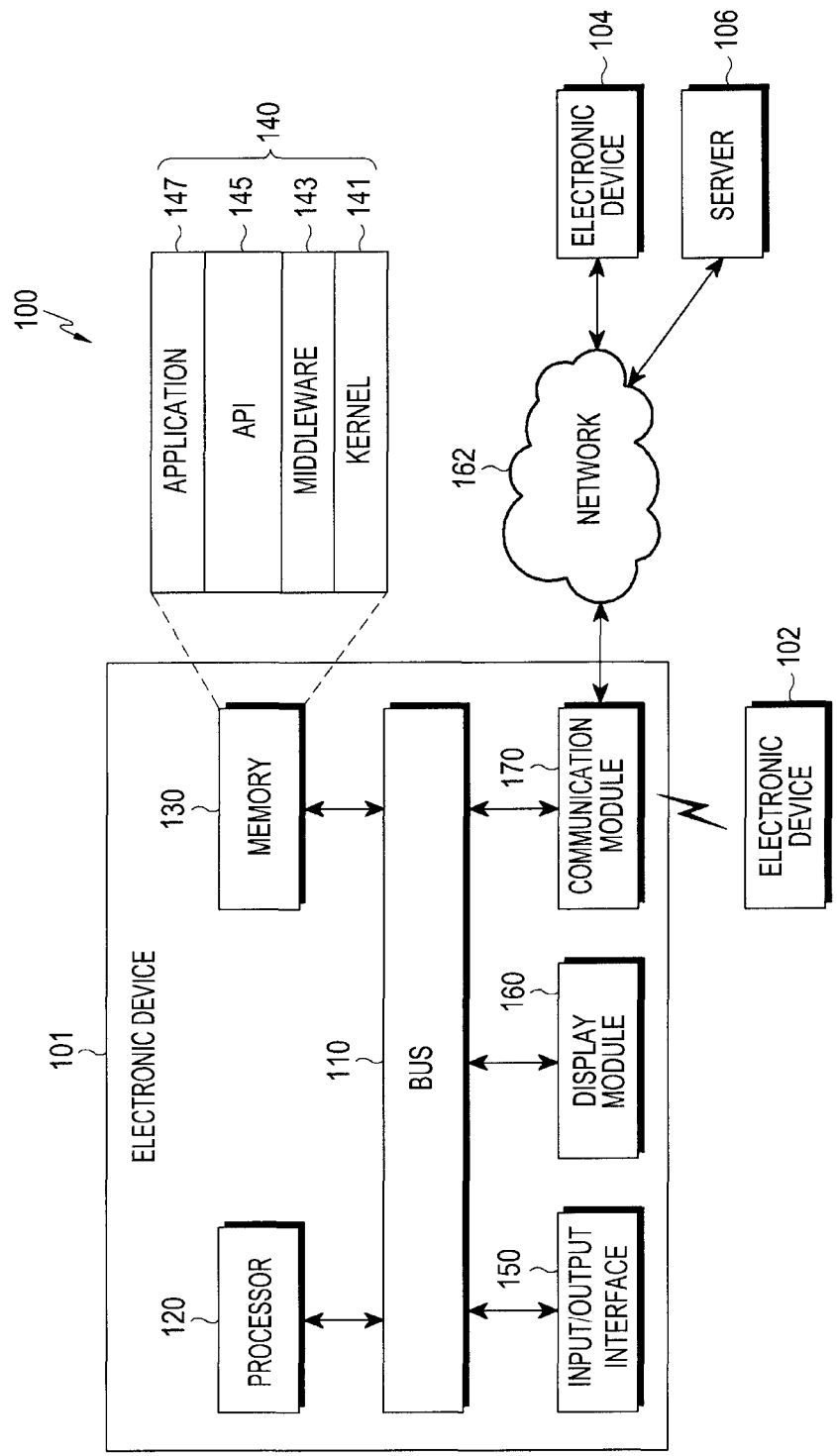
FIG. 1 illustrates a network environment including an electronic device according to various embodiments.

Hereinafter, various embodiments of the present disclosure will be described with reference to the accompanying drawings. However, it should be understood that there is no intent to limit the claimed subject matter as defined by the appended claims to the particular forms disclosed herein; rather, the claimed subject matter should be construed to cover various modifications, equivalents, and/or alternatives of embodiments of the present disclosure. In the description of the drawings, similar reference numerals may be used to designate similar elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure or in the appended claims may modify various components regardless of the order and/or the importance but does not limit the corresponding components. The above terms may be used to distinguish one element from another element. For example, a first user device and a second user device may indicate different user devices regardless of the sequence or importance thereof. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when it is mentioned that one element (e.g., a first element) is "directly coupled" or "directly connected" to another element (e.g., a second element), it may be construed that yet another element does not exist between the one element and the another element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, the singular forms may include the plural forms as well, unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the contextual meanings understood in the relevant field of the art, and are not to be interpreted to have excessively formal meanings unless clearly defined in the present disclosure. In some cases, even a term defined in the present disclosure should not be interpreted to exclude embodiments of the present disclosure.

Examples of an electronic device according to various embodiments of the present disclosure may include a smart phone, a tablet Personal Computer (PC), a mobile phone, a hand-held device (e.g., a device of a size small enough to be easily held in one hand), a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

Referring to FIG. 1, a block diagram of an electronic device 101 within a network environment 100 according to various embodiments is illustrated. The electronic device 101 may include a bus 110, a processor 120, a memory 130, an input/output interface 150, a display 160, and a communication interface 170. In other embodiments, the electronic device 101 may omit at least some of the above components or further include other components.

The bus 110 may include a medium for connecting the components 110 to 170 and transmitting communication between the components (for example, control message and/or data).

The processor 120 may include one or more of a Central Processing Unit (CPU), an Application Processor (AP), and a Communication Processor (CP). The processor 120 may control, for example, one or more other components of the electronic device 101 and/or process an operation or data related to communication.

The memory 130 may include a volatile memory and/or a non-volatile memory. The memory 130 may store, for example, commands or data related to one or more other components of the electronic device 101. According to an embodiment, the memory 130 may store software and/or a program 140. The program 140 may include a kernel 141, middleware 143, an Application Programming Interface (API) 145, and/or an application program (or application) 147. At least some of the kernel 141, the middle 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 131 may provide an interface through which the middleware 132, the API 133, or the application program 134 may access individual components of the electronic device 101 to control or manage system resources.

The middleware 143 may serve as, for example, an intermediary such that the API 145 or the application program 147 communicate with the kernel 141 to transmit/receive data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is an interface by which the applications 147 control functions provided from the kernel 141 or the middleware 143, and may include, for example, at least one interface or function (for example, instructions) for file control, window control, image processing, or text control.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, proximity, or hovering input using an electronic device or a user's body part.

The communication interface 170 may configure communication between, for example, the electronic device and an external device (for example, a first external electronic device 102, a second external electronic device 104, or a server 106). For example, the communication interface 170 may be connected to a network 162 through wireless or wired communication to communicate with the external device (for example, the external electronic device 104 or the server 106).

The wireless communication may be in accordance with a protocol such as, for example, at least one of LTE, LTE-A, CDMA, WCDMA, UMTS, WiBro, and GSM as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include a telecommunications network, for example, at least one of a computer network (for example, LAN or WAN), Internet, and a telephone network.

Each of the first and second external electronic devices 102 and 104 may be a device which is the same as or different from the electronic device 101. According to an embodiment, the server 106 may include a group of one or more servers. According to various embodiments which involve task sharing, all or some of the operations performed by the electronic device 101 may be performed by another electronic device or a plurality of electronic devices (for example, the electronic device 102 and 104 or the server 106). According to an embodiment, when the electronic device 101 would otherwise perform some functions or services automatically or by a request, the electronic device 101 may make a request for performing at least some of the functions related to the functions or services to another device (for example, the electronic devices 102 and 104 or the server 106) instead of performing the functions or services by itself. Another electronic device (for example, the electronic devices 102 and 104 or the server 106) may execute the requested functions or additional functions, and transmit a result thereof to the electronic device 101. The electronic device 101 may provide the requested functions or services based on the received result or after additionally processing the received result. To this end, for example, a cloud computing, distributed computing, or client-server computing technology may be used. According to an embodiment, the second electronic device 102 may include at least one of, for example, a cloud server, a social media server (for example, an SNS server, a Facebook® server, or a Twitter® server), and a web server.

Figure 2:
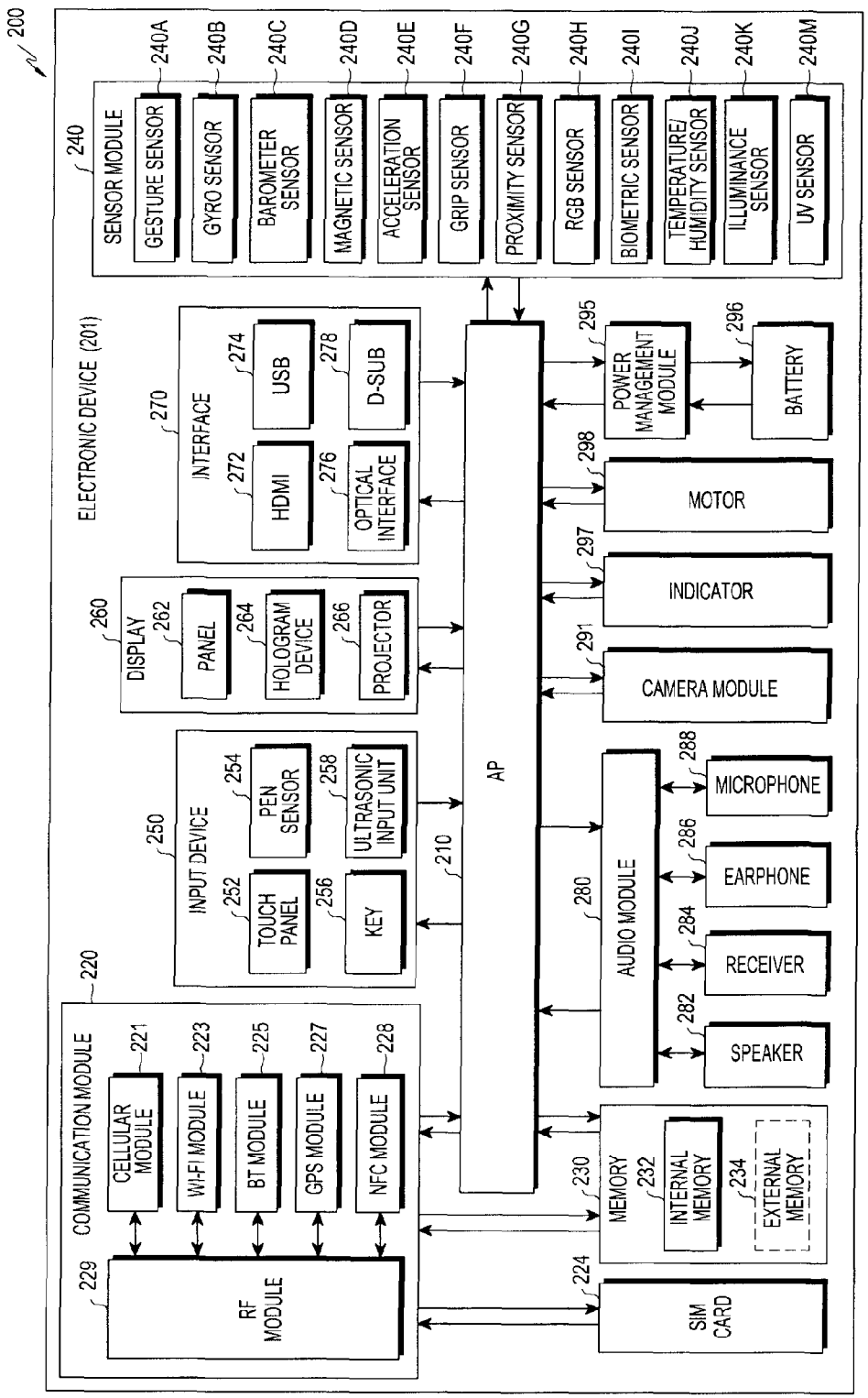
FIG. 2 illustrates a hardware structure of an electronic device according to various embodiments.

FIG. 2 illustrates a hardware configuration 200 of an electronic device 201 according to various embodiments. The electronic device 201 may include, for example, all or some of the components of the electronic device 101 shown in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 by driving an operating system or an application program and perform processing of various pieces of data and calculations. The AP 210 may be implemented by, for example, a System on Chip (SoC). According to an embodiment, the AP 210 may further include a Graphic Processing Unit (GPU) and/or an image signal processor. The AP 210 may include at least some of the components (for example, a cellular module 221) illustrated in FIG. 2. The AP 210 may load commands or data received from at least one of the other components (for example, a non-volatile memory) in a volatile memory, process the loaded commands or data, and store various pieces of data in the non-volatile memory.

The communication module 220 may have a component equal or similar to the communication interface 160 of FIG. 1. The communication module 220 may include, for example, a cellular module 221, a Wi-Fi module 223, a Bluetooth (BT) module 225, a Global Positioning System (GPS) module 227, a near field communication (NFC) module 228, and a Radio Frequency (RF) module 229.

The cellular module 221 may provide a voice call, image call, SMS, or Internet service through, for example, a communication network. According to an embodiment, the cellular module 221 may distinguish between and authenticate electronic devices 201 within a communication network using a subscriber identification module (for example, the SIM card 224). According to an embodiment, the cellular module 221 may perform at least some of the functions which can be provided by the AP 210. According to an embodiment, the cellular module 221 may include a Communication Processor (CP).

Each of the WiFi module 223, the BT module 225, the GPS module 227, and the NFC module 228 may include, for example, a processor for processing data transmitted/received through the corresponding module. According to any embodiment, at least some (two or more) of the cellular module 221, the WiFi module 223, the BT module 225, the GPS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA) or an antenna. According to another embodiment, at least one of the cellular module 221, the WiFi module 223, the BT module 225, the GPS module 227, and the NFC module 228 may transmit/receive an RF signal through a separate RF module.

The SIM card 224 may include a card including a subscriber identification module and/or an embedded SIM, and contain unique identification information (for example, an Integrated Circuit Card Identifier (ICCID)) or subscriber information (for example, an International Mobile Subscriber Identity (IMSI)).

The memory 230 may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, an illumination sensor 240K, and an Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In any embodiment, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer and provide a tactile reaction to the user.

The (digital) pen sensor 254 may include, for example, a recognition sheet which is a part of the touch panel or a separate recognition sheet. The key 256 may include, for example, a physical button, an optical key or a keypad. The ultrasonic input device 258 may detect an acoustic wave using a microphone (for example, the microphone 288) of the electronic device 201 through an input tool generating an ultrasonic signal to identify data.

The display 260 (which may be an example of the display 160) may include a panel 262, a hologram device 264 or a projector 266. The panel 262 may include a component equal or similar to the display 160 of FIG. 1. The panel 262 may be implemented to be, for example, flexible, transparent, or wearable. The panel 262 may also be configured as one module together with the touch panel 252. The hologram device 264 may show a stereoscopic image in the air using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert a sound and an electrical signal. At least some components of the audio module 280 may be included in, for example, the input/output interface 140 illustrated in FIG. 1. The audio module 280 may process sound information input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may have wired and/or wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining amount of battery, a charging voltage, current, or temperature. The battery 296 may include, for example, a rechargeable battery and/or a solar battery.

The indicator 297 may show particular statuses of the electronic device 201 or a part (for example, AP 210) of the electronic device 201, for example, a booting status, a message status, a charging status and the like. The motor 298 may convert an electrical signal to mechanical vibration, and may generate a vibration or haptic effect. Although not illustrated, the electronic device 201 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. The electronic device 100 may include at least one of the above-described component elements, and some component elements may be omitted or an additional component element may be added. Further, some of the components of the electronic device according to the various embodiments of the present disclosure may be combined to form a single entity, and thus, may equivalently execute functions of the corresponding elements prior to the combination.

Figure 3:
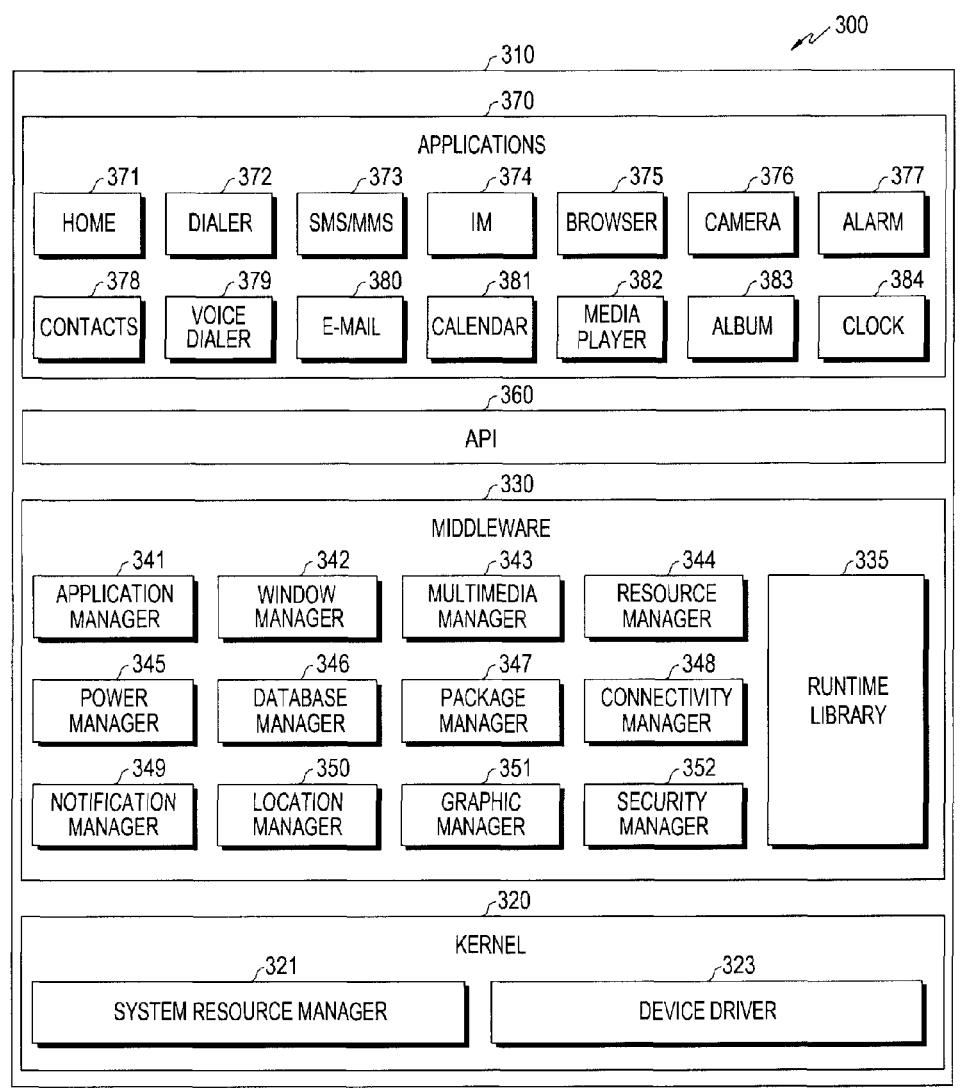
FIG. 3 is a block diagram of a program module of an electronic device according to various embodiments.

FIG. 3 is a block diagram 300 of a program module 310 according to various embodiments. According to an embodiment, the program module 310 (for example, the program 140) may include an Operating System (OS) for controlling resources related to the electronic device (for example, the electronic device 101) and/or various applications (for example, the application program 147) executed in the operating system. The OS may be, for example, Android, iOS, Windows, Symbian, Tizen, Bada or the like.

The programming module 310 may include a kernel 310, middleware 330, an Application Programming Interface (API) 360, and/or an application 370. At least some of the program module 310 may be preloaded in the electronic device or downloaded in the server (for example, the server 106).

The kernel 320 (which is an example of the kernel 141) may include, for example, a system resource manager 321 or a device driver 323. The system resource manager 321 may control, allocate, or collect the system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources of the electronic device. According to an embodiment, the middleware 330 (an example of the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the application 370 is executed. For example, the runtime library 335 may execute management of an input/output, management of a memory, a function associated with an arithmetic function or the like.

The application manager 341 may manage, for example, a life cycle of at least one application among the applications 370. The window manager 342 may manage a GUI resource used in the screen. The multimedia manager 343 may detect a format required for reproducing various media files and perform encoding or decoding of a media file using a codec suitable for the corresponding format. The resource manager 344 may manage resources such as a source code, a memory or a storage space of at least one application among the applications 370.

The power manager 345 may manage a battery or power while operating together with a Basic Input/Output System (BIOS), and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage a wireless connection of, for example, Wi-Fi or Bluetooth. The notification manager 349 may display or make a notification of an event such as a received message, an appointment, and a proximity notification to a user without disturbance. The location manager 350 may manage location information of the electronic device. The graphic manager 351 may manage graphic effects to be provided to a user and user interfaces related to the graphic effects.

The security manager 352 may provide various security functions required for system security or user authentication. According to an embodiment, when the electronic device (for example, electronic device 101) has a call function, the middleware 330 may further include a telephony manager for managing a voice call function or a video call function of the electronic device.

The middleware 330 may include a middleware module that forms a combination of various functions of the above described components. The middleware 330 may provide modules specialized according to types of operating systems in order to provide differentiated functions. In addition, some of the exiting components may be dynamically removed from the middleware 330, or new components may be added to the middleware 330.

The API 360 (an example of the API 145) is a set of API programming functions, and a different configuration thereof may be provided according to an operating system. For example, with respect to each platform, one API set may be provided in a case of Android or iOS, and two or more API sets may be provided in a case of Tizen.

The applications 370 (an example of the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and external electronic devices (for example, the electronic devices 102 and 104). The information exchange application may include, e.g., a notification relay application for transmitting specific information to the external electronic device, or a device management application for managing the external electronic device.

For example, the notification relay application may include a function of transferring, to the external electronic device (e.g., 102 or 104), notification information generated from other applications of the electronic device 101 (for example, an SMS/MMS application, an e-mail application, a health management application, or an environmental information application). Further, the notification relay application may receive notification information from, for example, the external electronic device and provide the received notification information to the user. The device management application may manage (for example, install, delete, or update), for example, a function for at least a part of the external electronic device (e.g., 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes (for example, attributes of the electronic device such as the type of electronic device which corresponds to a mobile medical device) of the external electronic device (e.g., 102 or 104). According to an embodiment, the applications 370 may include an application received from the external electronic device (e.g., server 106, or device 102 or 104). According to an embodiment, the applications 370 may include a preloaded application or a third party application which can be downloaded from the server. Names of the components of the program module 310 according to the above described embodiments may vary depending on the type of operating system.

According to various embodiments, at least a part of the programming module 310 may be implemented by software, firmware, hardware, or a combination of at least two of them. At least a part of the programming modules 310 may be implemented (for example, performed) by, for example, the processor 210. At least some of the programming module 310 may include, for example, a module, a program, a routine, sets of instructions, or a process for performing one or more functions.

The term "module" used in the present disclosure may refer to, e.g., a unit including one or more combinations of hardware, software, and firmware. The word "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (or modules or functions thereof) or a method (or method operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) or a Digital Versatile Disc (DVD)), magneto-optical media (e.g., a floptical disk), a hardware device (e.g., a Read Only Memory (ROM), a Random Access Memory (RAM), or a flash memory), and the like. In addition, the program instructions may include high level language codes, which can be executed in a computer by using an interpreter, as well as machine codes made by a compiler. The aforementioned hardware device may be configured to perform functions otherwise performed by one or more software modules in order to perform an operation(s) of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Figure 4:
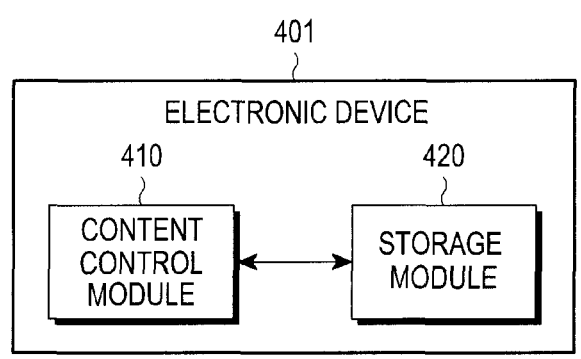
FIG. 4 illustrates a structure of an electronic device for controlling contents according to various embodiments.

FIG. 4 illustrates example modules within an electronic device 401 for a content control according to various embodiments. Electronic device 401 may be an example of any one of electronic devices 101, 102, 104 or the server 106 discussed earlier in connection with FIG. 1. According to various embodiments, the electronic device 401 may include a content control module 410 and a storage module 420. The content control module 410 may be part of the processor 120 illustrated in FIG. 1. Further, the content control module 410 may include a combination of one or more of, for example, hardware, software and firmware.

According to various embodiments, when one or more contents (for example, image, text, audio data, or video) are transmitted from electronic device 401 to another electronic device (for example, an second electronic device or an third electronic device), the content control module 410 may acquire the contents or log information (for example, capture information, edit information, share information, or transmission information) recorded in connection with access to the contents from the electronic device 401 or another electronic device.

According to an embodiment, when the contents are transmitted to another electronic device, the content control module 410 may acquire connection information (for example, a Uniform Resource Locator (URL), an ID of an electronic device, or a unique address of an electronic device) related to the contents transmitted to the electronic device. For example, when the contents are uploaded to a social media server such as an SNS, Facebook, or Twitter, the content control module 410 may acquire connection information (for example, a URL, an ID of the electronic device, or a unique address of the electronic device) from the social media server.

According to an embodiment, when the contents are captured in the electronic device 401, the content control module 410 may acquire capture information related to the contents (for example, category information on the capture, capture time information, or information on the electronic device performing the capture). For example, the content control module 410 may store capture information including at least one of the category information "capture", the capture time information "2013-09-16 10:00:00" and the information on the electronic device performing the capture "Galaxy S4" (identifying a smartphone type) or "Joe's Galaxy S4" (identifying a particular user's smartphone and its type) or the like as attribute information.

According to an embodiment, when the contents are edited in electronic device 401 or another electronic device, the content control module 410 may acquire edit information related to the contents (e.g., category information on the edit, edit time information, or information on the electronic device performing the edit). For instance, the content control module 410 may store edit information including at least one of the category information "edit", the capture date and time information "2013-09-17 10:00:00" and the information on the electronic device performing the edit "Galaxy S4" as attribute information.

According to an embodiment, when the electronic device 401 shares contents with another electronic device, the content control module 410 may acquire share information related to the contents (for example, category information on the share, share time information, or information or connection information on the device sharing the contents). For example, when the contents are uploaded to the server of Facebook®, the content control module 410 may store share information including at least one of the category information "share", the share time information "2013-09-17 10:30:00", the information on the sharing device "Facebook", and the connection information "http//fb.com/photo/21/ . . . " as attribute information.

According to an embodiment, when the electronic device 401 transmits contents to another electronic device, the content control module 410 may acquire transmission information related to the contents (for example, category information on the transmission, transmission time information, information on the another electronic device, or transmission means information). For example, when the electronic device transmits the contents to another electronic device, the content control module 410 may store transmission information including at least one of the category information "transmit", the transmission time information "2013-09-17 10:32:00", the connection information of another electronic device "010-000-1111", and the transmission means information "MMS" (Multi-Media Service) as attribute information.

According to an embodiment, when the contents are transmitted to another electronic device, the content control module 410 may transmit at least some of the attribute information related to the contents to another electronic device. At least some of the attribute information may be configured to be selected by, for example, the user and transmitted to another electronic device.

According to an embodiment, the content control module 410 may include, for example, capture information, edit information, or connection information of a cloud server storing the contents in the attribute information related to the contents. For example, the capture information and the edit information may be pre-configured as the attribute information which can be transmitted to another electronic device. Further, the capture information and the edit information may be configured at a time point at which the contents are transmitted to another electronic device or before the time point.

According to an embodiment, when the attribute information related to the contents or the contents are updated, the content control module 410 may transmit the updated attribute information to another electronic device to which the contents have been transmitted.

According to an embodiment, when at least some of the attribute information related to the contents is updated, the content control module 410 may transmit the updated attribute information to another electronic device. In this case, at least some of the attribute information may be configured as attribute information which can be transmitted to another electronic device.

According to various embodiments, the content control module 410 may receive other (second) contents related to the (first) contents, from another electronic device using the connection information among the attribute information related to the first contents. The second contents may be, for example, an image, text, audio data, or video. The content control module 410 may also receive attribute information related to the second contents, e.g., other connection information (for example, a URL, an ID of the electronic device, or a unique address of an electronic device) from another electronic device using the connection information. (The other connection information may be one type of attribute information related to the second contents. The second contents or information about the second contents may be considered a type of attribute information related to the first contents.)

According to an embodiment, the content control module 410 may receive the second contents or the other connection information from another electronic device through a request from the electronic device 401, push notification (for example, push messaging) from another electronic device, or automatically (for example, a periodic update).

According to an embodiment, the content control module 410 may store the second contents or the other connection information received from another electronic device as the attribute information related to the first contents.

According to an embodiment, the content control module 410 may display the second contents received from another electronic device on a display (for example, the display 260) functionally connected to the content control module 410 together with the contents.

According to an embodiment, the content control module 410 may upload first contents to another electronic device (for example, a social media server or the server 106) and acquire connection information (for example, a URL, an ID of an electronic device, or a unique address of an electronic device) among the attribute information related to the first contents. According to an embodiment, the content control module 410 may receive second contents related to the first contents, for example, text information such as replies, emoticons, or images from another electronic device using the connection information.

According to various embodiments, the content control module 410 may display notification information (for example, an indicator, icon, or color) related to the attribute information in at least some of the display areas (for example, at least some areas for displaying one or more contents or an external area for displaying one or more contents) related to the one or more contents through a display 160 or 260, hereafter just "the display" using log information (for example, capture information, edit information, share information, or transmission information).

According to an embodiment, through the use of information received from a social media server or information acquired from each application, the content control module 410 may display notification information (for example, a Kakao Talk® icon or a Facebook® icon) related to the information received from the server or the information acquired from each application in at least some of the display areas (for example, at least some areas for displaying one or more contents or an external area for displaying one or more contents) related to one or more contents through the display while displaying the one or more contents.

According to an embodiment, while displaying one or more first contents, the content control module 410 may select one or more first contents from the one or more first contents through an input. In this case, through the use of second contents (for example, text information such as replies or emotions, or images) stored as attribute information related to the first contents, the content control module 410 may display the second contents or the one or more first contents on the display. According to an embodiment, through the use of other connection information (for example, a URL, an ID of an electronic device, or a unique address of an electronic device) related to the first contents, the content control module 410 may receive information related to second contents. This information (for example, text information such as replies, emoticons, or images) may be received from another electronic device. Electronic device 401 may then display the one or more first contents or the one or more second contents on the display.

According to an embodiment, while displaying the one or more contents, the content control module 410 may select one or more contents through an input. In this case, according to an embodiment, through the use of the connection information (for example, a URL, an ID of an electronic device, or a unique address of an electronic device) among the attribute information related to the contents, the content control module 410 may receive the one or more other contents from another devices and display the contents on the display.

According to an embodiment, while displaying the contents and the one or more other contents, the content control module 410 may detect the generation of new contents (for example, text such as replies) related to the other contents through an input. In this case, according to an embodiment, the content control module 410 may transmit the new contents to another electronic device using the connection information of the contents.

According to an embodiment, when the new contents are transmitted to another electronic device, the content control module 410 may store the new contents or at least one piece of connection information related to the new contents as the attribute information related to the contents.

According to various embodiments, when other contents and attribute information related to the other contents are received from another electronic device, the content control module 410 may identify and display information on the other contents using the attribute information or make a request for information related to the other contents to still another electronic device using the identified information.

According to an embodiment, the content control module 410 may display the attribute information related to the other contents on the display by identifying transmission logs of the other contents.

According to an embodiment, when the attribute information related to the other contents includes capture information and transmission information, the content control module 410 may identify capture information of the other contents (for example, capture place, capture time, or information on the electronic device capturing the contents) and transmission information of the other contents (for example, a transmission means, transmission time, or a sender and receiver) using the attribute information. In this case, the content control module 410 may display the identified information on the display as transmission log information of the other contents.

According to an embodiment, the content control module 410 may identify connection information of another electronic device having received the other contents except for the electronic device 401 using log information of the other contents. In this case, according to an embodiment, the content control module 410 may request and receive information related to the other contents from another electronic device using the identified connection information of another electronic device.

For example, the content control module 410 may identify a social media server such as an SNS to which the other contents are uploaded using the attribute information related to the other contents. In this case, the content control module 410 may make a request for popularity information of the other contents to the social media server and receive the popularity information of the other contents (for example, the number of hits, the number of replies, and the number of Likes) from the social media server in response to the request. The content control module 410 may display the popularity information of the other contents on the display.

In another example, the content control module 410 may identify a social media server such as an SNS to which original contents of the one or more other contents are uploaded using the attribute information related to the other contents. In this case, the content control module 410 may make a request for the original contents of the other contents to the social media server and receive the original contents of the other contents from the social media server in response to the request. The content control module 410 may display the original contents of the other contents on the display.

According to various embodiments, when one or more contents (for example, images, text, audio data, or videos) are received from another electronic device, the content control module 410 may store connection information of another electronic device (for example, a URL, an ID of an electronic device, or an unique address of an electronic device) having transmitted the contents as attribute information related to the contents.

According to an embodiment, the content control module 410 may receive the contents or the attribute information related to the contents from another electronic device and store the contents or the attribute information related to the contents in the storage module 420.

According to an embodiment, when one or more other contents (for example, text such as replies) related to the contents are generated while the contents are displayed, the content control module 410 may store the other contents or connection information related to the other contents as the attribute information related to the contents.

According to an embodiment, whenever one or more other contents related to the contents are generated, the content control module 410 may transmit the other contents or at least one piece of connection information related to the other contents to another electronic device.

According to an embodiment, the content control module 410 may transmit the other contents or at least one piece of the connection information related to the other contents to another electronic device according to a request from another electronic device.

According to an embodiment, when new contents related to the one or more contents are received from another electronic device, the content control module 410 may store the new contents or at least one piece of connection information related to the new contents as the attribute information related to the one or more contents.

According to an embodiment, when new contents related to the one or more other contents related to the contents are received from another electronic device, the content control module 410 may display the new contents on the display.

According to an embodiment, when update attribute information related to the contents are received from another electronic device, the content control module 410 may update the attribute information of the one or more contents based on the received update attribute information.

According to various embodiments, when related information of the contents are requested from still another electronic device to which another electronic device has transmitted the contents, the content control module 410 may detect the related information of the contents and transmit the detected related information of the contents to still another electronic device.

For example, when popularity information of the contents is requested from still another electronic device, the content control module 410 may detect the popularity information of the contents (for example, the number of hits, the number of replies, and the number of Likes) and transmit the detected popularity information of the contents to still another electronic device. In another example, when original contents of the contents are requested from still another electronic device, the content control module 410 may detect the original contents of the contents and transmit the detected original content to still another electronic device.

According to various embodiments, the storage module 420 may be, for example, the memory 130 illustrated in FIG. 1. According to an embodiment, the storage module 220 may store one or more contents or one or more pieces of attribute information related to the one or more contents.

Figure 5A:
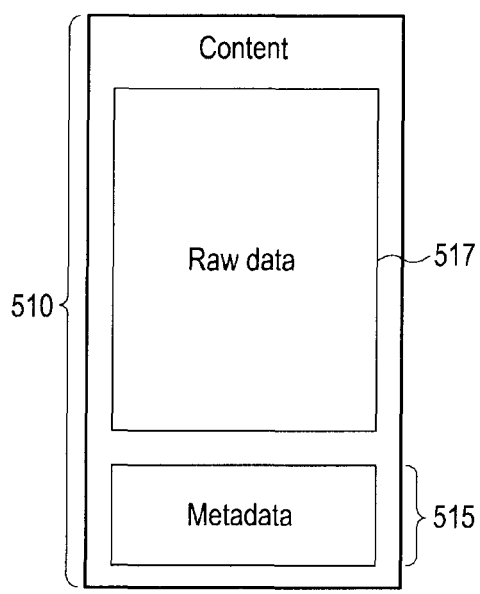
FIG. 5A and FIG. 5B illustrate respective configurations of contents according to various embodiments.
Figure 5B:
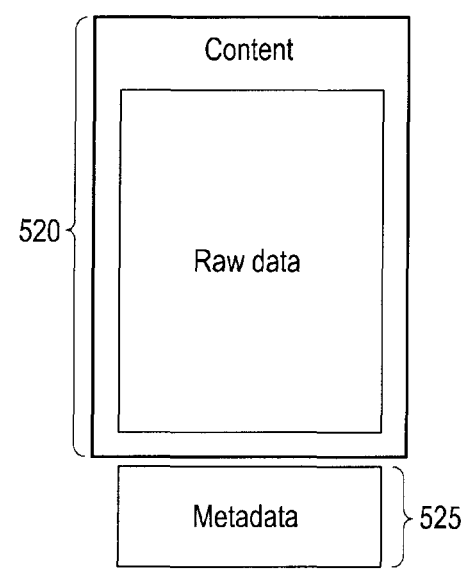

FIGS. 5A to 5B illustrate storage configurations of contents according to various embodiments. Referring to FIG. 5A, according to an embodiment, contents 510 (e.g., displayable at electronic device 101) may include attribute information (metadata) 515 and may be stored in a storage module (e.g. 420). For example, the contents 510 may be embedded type contents 510 including the attribute information (metadata) 515. That is, the metadata 515 is embedded with the raw data 517 of the contents 510, e.g., stored in a common file with the contents 510. Referring to FIG. 5B, according to another embodiment, contents may be linked with the attribute information and stored in the storage module 420. For example, contents 520 may be separated type contents which do not include attribute information (metadata) 525 existing separately (but linked to the contents 520).

According to various embodiments, the storage module 420 may store contents, and the content control module 410 may transmit the contents to other electronic devices and store log information recorded in connection with access to the contents by the electronic device 401 or at least one of the other electronic devices as attribute information (metadata) related to the contents According to various embodiments, the one or more contents may include at least one of an image, text, audio data, or video.

According to various embodiments, the log information may include at least one of capture information, edit information, share information, or transmission information.

According to various embodiments, the other electronic device may be at least one of a cloud server, a social media server, and a web server.

According to various embodiments, the content control module 410 may be configured to store the contents in a manner such that the attribute information is stored as a part of the contents.

According to various embodiments, the content control module 410 may be configured to display the contents or at least one of other contents received in connection with the contents from the other electronic device on a display functionally connected to the content control module using the attribute information.

According to various embodiments, the content control module 410 may be configured to further receive other log information or other contents from the other electronic device or an external electronic device using the attribute information.

According to various embodiments, the content control module 410 may be configured to store the other log information or the other contents as the attribute information related to the contents.

According to various embodiments, the content control module 410 may be configured to transmit attribute information of the contents to the other electronic device separately from the contents or as a part of the contents.

According to various embodiments, the content control module 410 may be configured to transmit attribute information updated in connection with the contents to the other electronic device.

According to various embodiments, the content control module 410 may be configured to display the contents in a distinguishing manner from other contents using an indicator while displaying a content list including the contents and the other contents.

According to various embodiments, the content control module 410 may be configured to display the other (second) contents received in connection with the (first) contents using the attribute information while displaying the first contents.

According to various embodiments, the storage module 420 may store first contents, and the content control module 410 may be configured to receive second contents from another electronic device and identify logs recorded in connection with access to the first contents by at least one of other electronic devices using attribute information related to the second contents.

According to various embodiments, the content control module 410 may be configured to identify information on one or more other electronic devices having received the second contents from the attribute information and receive additional information in connection with the second contents from the one or more other electronic devices.

According to various embodiments, the additional information may include at least one of popularity information related to the second contents or original contents of the second contents.

According to various embodiments, the storage module 420 may store second contents received from other electronic devices, and the content control module 410 may be configured to store log information recorded in connection with access to the second contents by the electronic device 401 or at least one of the other electronic devices as attribute information (metadata) related to the one or more first contents.

According to various embodiments, the log information may include at least one of capture information, edit information, share information, or transmission information.

According to various embodiments, the other electronic device may include a device having a display function.

According to various embodiments, the content control module 410 may be configured to store the contents which include the attribute information as a part of the contents.

According to various embodiments, the content control module 410 may be configured to store information on the second contents generated while the contents are displayed, as the attribute information.

According to various embodiments, the content control module 410 may be configured to receive a request for particular information related to the contents from another electronic device, detect the particular information from the attribute information, and transmit the detected particular information to the other electronic device.

According to various embodiments, the particular information may include at least one of popularity information related to the one or more contents and original contents of the one or more contents.

According to various embodiments, the content control module 410 may be configured to update attribute information of the one or more contents based on update attribute information received in connection with the second contents from the other electronic device.

According to various embodiments, the content control module 410 may be configured to store second contents received in connection with the first contents from the other electronic device as the attribute information.

Figure 6:
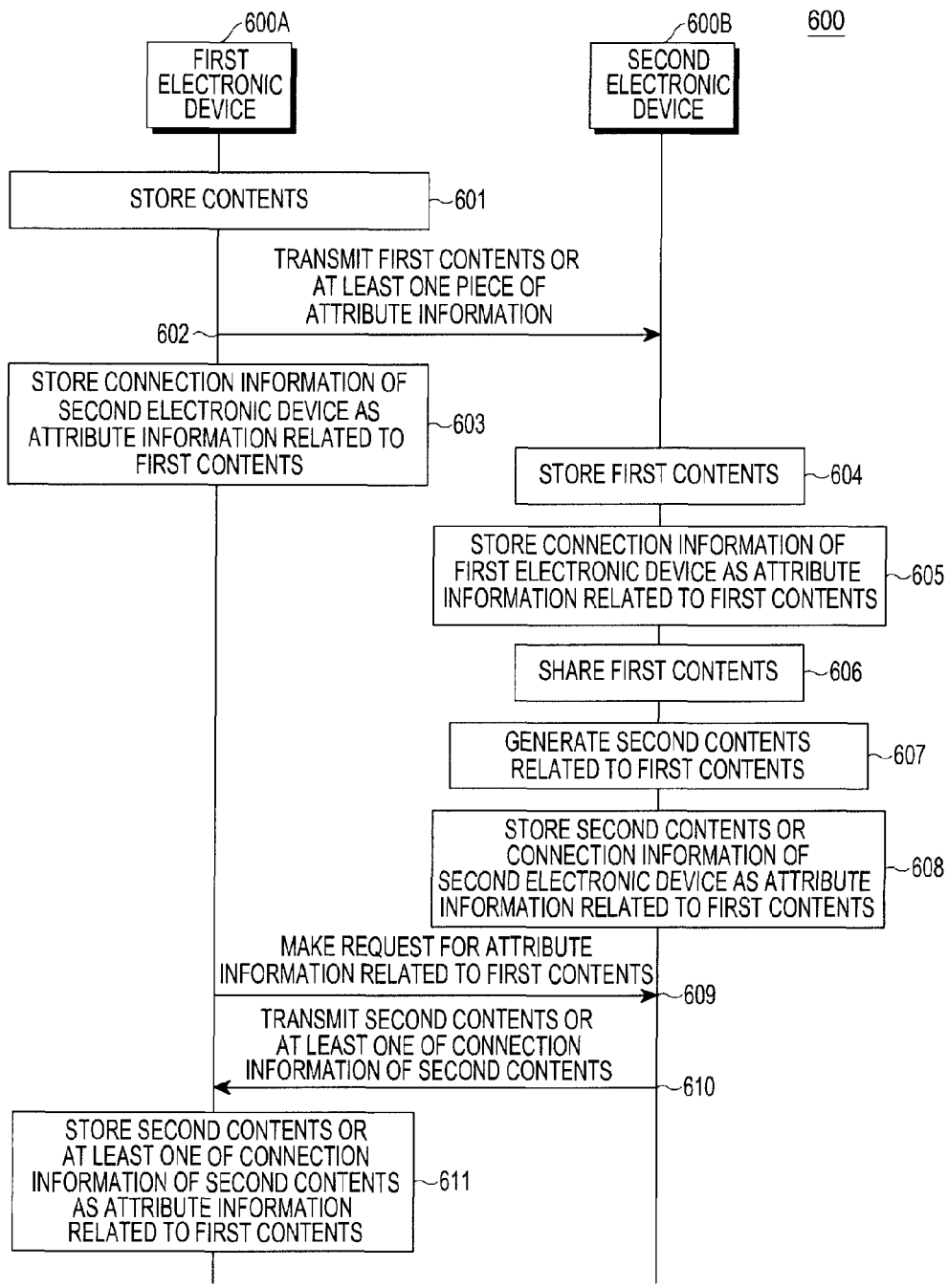
FIG. 6 is a flowchart illustrating a method of controlling a use log of contents according to various embodiments.

FIG. 6 is a flow diagram illustrating a method 600 of controlling a use log of contents according to various embodiments. With the method 600, at least one of a first electronic device 600A (for example, the electronic device 101) and a second electronic device 600B (for example, the server 106) may include, for example, a content control module (e.g. 410) and a storage module (e.g. 420). The content control module may transmit, for example, one or more contents to another electronic device, and may store connection information transmitted to the other electronic device in the storage module as attribute information related to the one or more contents. In the description below, it is assumed that first device 600A includes a first storage module 420 and second device 600B includes a second storage module 420.

In step 601, the first electronic device 600A may store one or more contents or attribute information related to the one or more contents in a first storage module 420 of the first electronic device 600A. For instance, the first electronic device 600A may store capture information of one or more contents captured by the first electronic device 600A as attribute information related to the one or more contents.

In step 602, according to a request of the first electronic device 600A or the second electronic device 600B, first contents of the one or more contents stored in the storage module or attribute information related to the first contents may be transmitted to the second electronic device 600B. For instance, a user of device 600A may send a digital photo or audio file as the first contents to device 600B as part of an MMS message or email message. According to an embodiment, the first electronic device 600A may transmit at least one of the attribute information related to the first contents (for example, attribute information having capture information) and the connection information of the first electronic device 600A (for example, an ID of the first electronic device or a unique address of the first electronic device) to the second electronic device 600B.

In step 603, the first electronic device 600A may further store connection information of the second electronic device 600B having received the first contents as additional attribute information related to the first contents.

In step 604, the second electronic device 600B may store the first contents received from the first electronic device 600A in a second storage module of the second electronic device 600B. In step 605, the second electronic device 600B may store the connection information of the first electronic device having transmitted the first contents (for example, an ID of the first electronic device or a unique address of the first electronic device) in the second storage module 420 as attribute information related to the first contents. When the attribute information related to the first contents (which may be the above-noted connection information and other attribute information) is received from the first electronic device 600A, the second electronic device 600B may store the received attribute information in the second storage module as the attribute information related to the first contents in step 605.

In step 606, the second electronic device 600B may display the first contents to be shared. In step 607, the second electronic device 600B may determine the generation of second contents related to the first contents while displaying the first contents. In step 608, the second electronic device 600B may store the second contents or at least one piece of connection information associated with the second contents in the second storage module as the attribute information related to the first contents.

In step 609, the first electronic device 600A may make a request for attribute information related to the first contents to the second electronic device 600B. In step 610, the second electronic device 600B may transmit any attribute information related to the first contents (for example, the second contents or the connection information of the second contents) to the first electronic device 600A. Further, whenever new attribute information related to the first contents is generated, the second electronic device 600B may transmit the new attribute information related to the first contents (for example, the second contents or the connection information of the second contents) to the first electronic device 600A without the request for the attribute information from the first electronic device 600A. For instance, predetermined criteria may be used to determine whether second contents transmitted by the second device 600B is considered related to the first contents. As one example, if a text message containing first contents is answered by a return text message with second contents within a predetermined period of time, the second contents may be considered attribute information. When the attribute information related to the first contents is received from the second electronic device 600B, the first electronic device 600A may store the attribute information related to the first contents received from the second electronic device 600B in the first storage module in step 611.

Figure 7A:
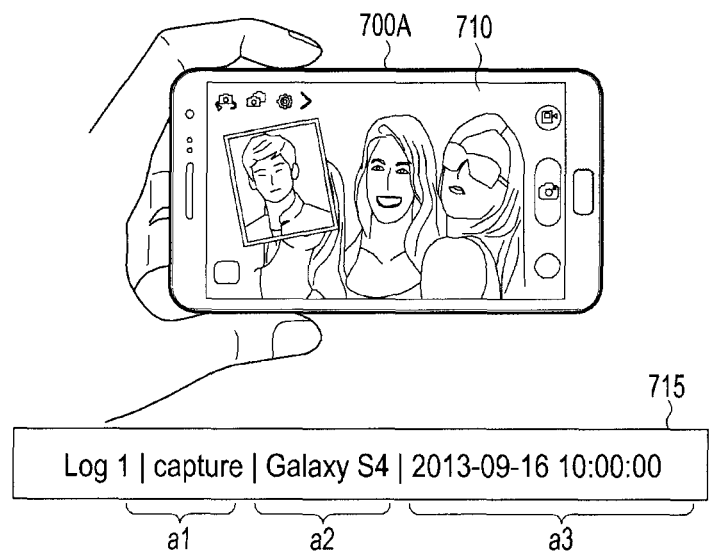
FIG. 7A, FIG. 7B and FIG. 7C each illustrate a respective example of generating attribute information of contents according to various embodiments.
Figure 7B:
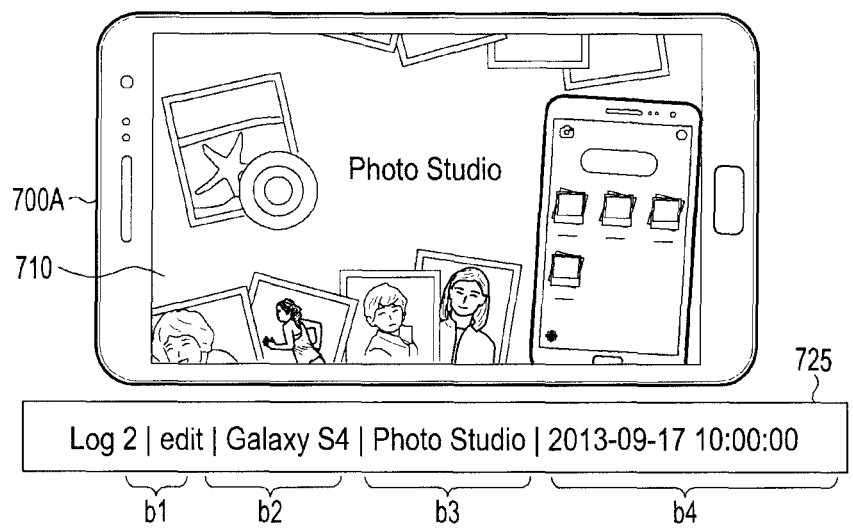
Figure 7C:
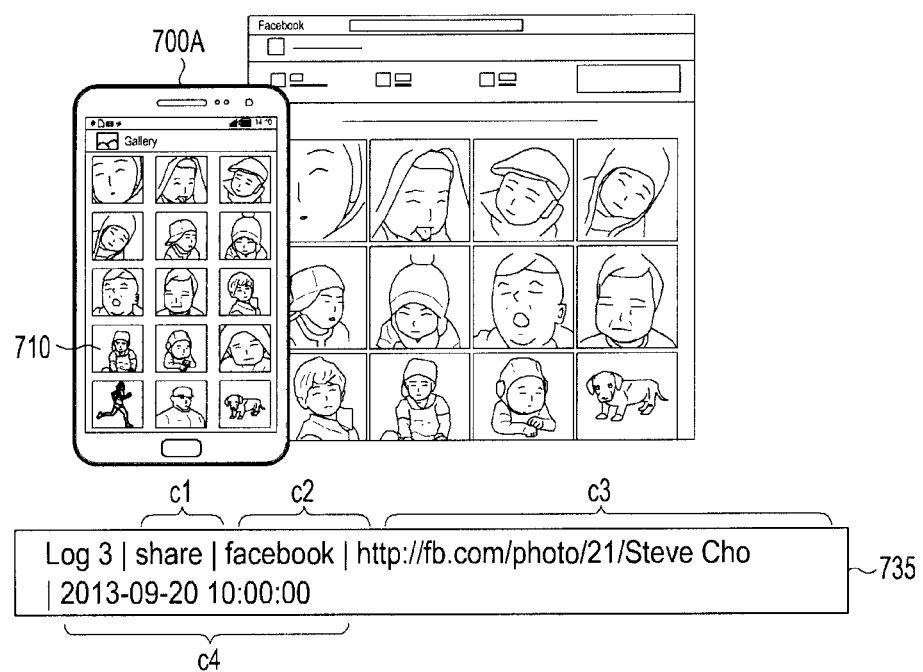

FIGS. 7A to 7C illustrate respective examples of generating attribute information of contents according to various embodiments. Referring to FIG. 7A, when a first electronic device 700A (e.g., electronic device 101) captures and stores a first image 710, capture information of the first image 710 may be stored as first attribute information 715 related to the first image 710. The first attribute information (Log 1) may include "capture" (a1) indicating category information, "Galaxy S4" (a2) indicating information of a device executing the capture, and "2013-09-16 10:00:00" (a3) indicating capture time information. Referring to FIG. 7B, when the first electronic device 700A edits the first image 710, edit information of the first image 710 may be stored as second attribute information 725 related to the first image 710. The second attribute information (Log 2) may include "Galaxy S4" (b2) indicating information of a device performing editing, "Photo Studio" (b3) indicating information of an application used for the editing, and "2013-09-17 10:00:00" (b4) indicating editing time information.

Referring to FIG. 7C, when the first electronic device 700A uploads the first image 710 to a social media server such as an SNS, "share" information of the first image 710 may be stored as third attribute information 735 related to the first image 710. The third attribute information (Log 3) may include "share" (c1) indicating category information, "Facebook"® (c1) indicating SNS service (or recipient device) receiving the information to be shared, "http//fb-.com/photo/21/Steve Cho" (c3) indicating connection information of the recipient device, and "2013-09-20 10:00:00" (c4) indicating share time information. The first, second and third attribute information of the first image 710 FIGS. 7A-7C may be stored in association with the first image 710 using one of the techniques described earlier, e.g., stored in the same file or in different, linked files.

Figure 8:
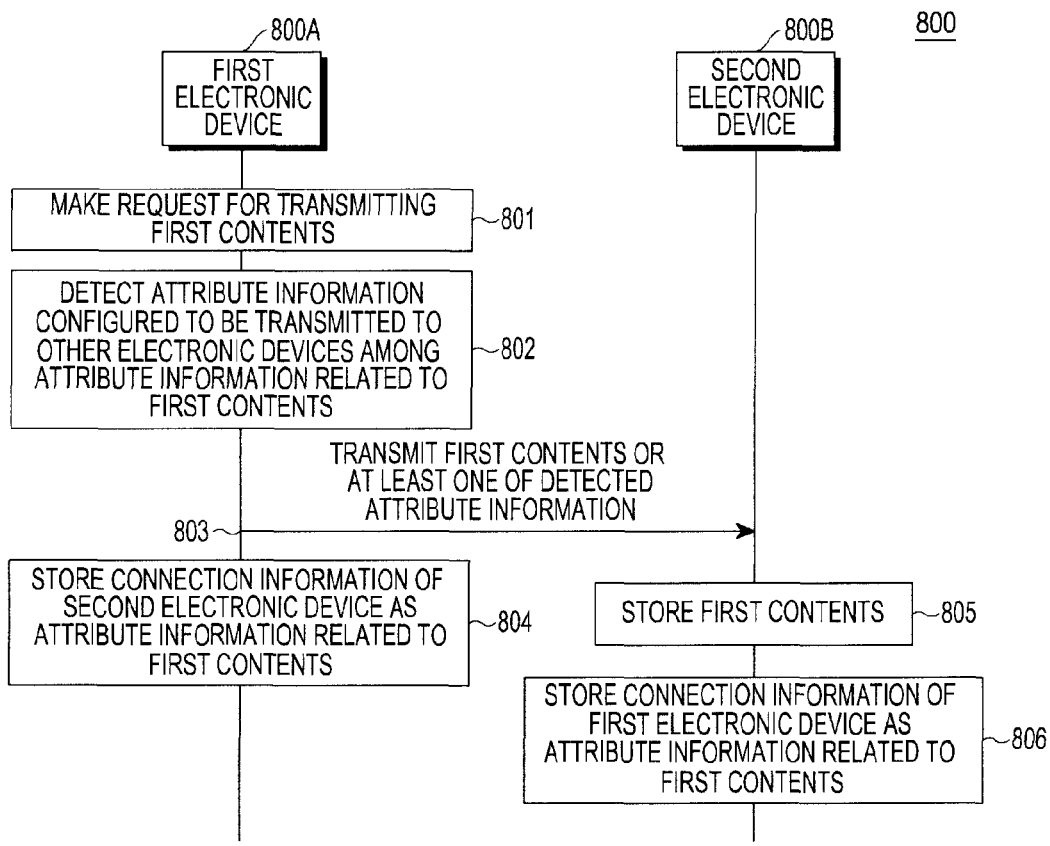
FIG. 8 is a flow diagram illustrating a method of controlling transmission of attribute information of contents according to various embodiments.

FIG. 8 is a flowchart illustrating a method 800 of controlling transmission of attribute information of contents according to various embodiments. Referring to FIG. 8, at least one of a first electronic device 800A (e.g. electronic device 101) and a second electronic device 800B (e.g. server 106) may include, for example, a content control module (e.g. 410) or a storage module (e.g. 420). The content control module may transmit, for example, at least some of attribute information related to one or more contents to another electronic device. In the description below, it is assumed that device 800A includes a first storage module 420 and device 800B includes a second storage module 420.

In step 801, the first electronic device 800A may first determine a request for transmitting (sharing) first contents of the one or more contents stored in a first storage module of the first electronic device 800A based on a user input. In step 802, the first electronic device 800A may then detect at least some of attribute information related to the first contents (for example, attribute information preset by a user's selection to be transmitted to another electronic device). In step 803, the first electronic device 800A may transmit at least one of the first contents and at least some of the attribute information related to the first contents to the second electronic device 800B.

In step 804, the first electronic device 800A may further store connection information of the second electronic device 800B having received the first contents as the attribute information related to the first contents.

In step 805, the second electronic device 800B may store the first contents received from the first electronic device 800A in the second storage module 420 of the second electronic device 800B. In step 806, the second electronic device 800B may store the connection information of the first electronic device having transmitted the first contents (for example, an ID of the first electronic device or a unique address of the first electronic device) in the second storage module as the attribute information related to the first contents. When at least some of the attribute information related to the first contents is received from the first electronic device 800A, the second electronic device 800B may store the received attribute information in the second storage module as the attribute information related to the first contents in step 806. The information may be stored in the second storage module 420.

Figure 9:
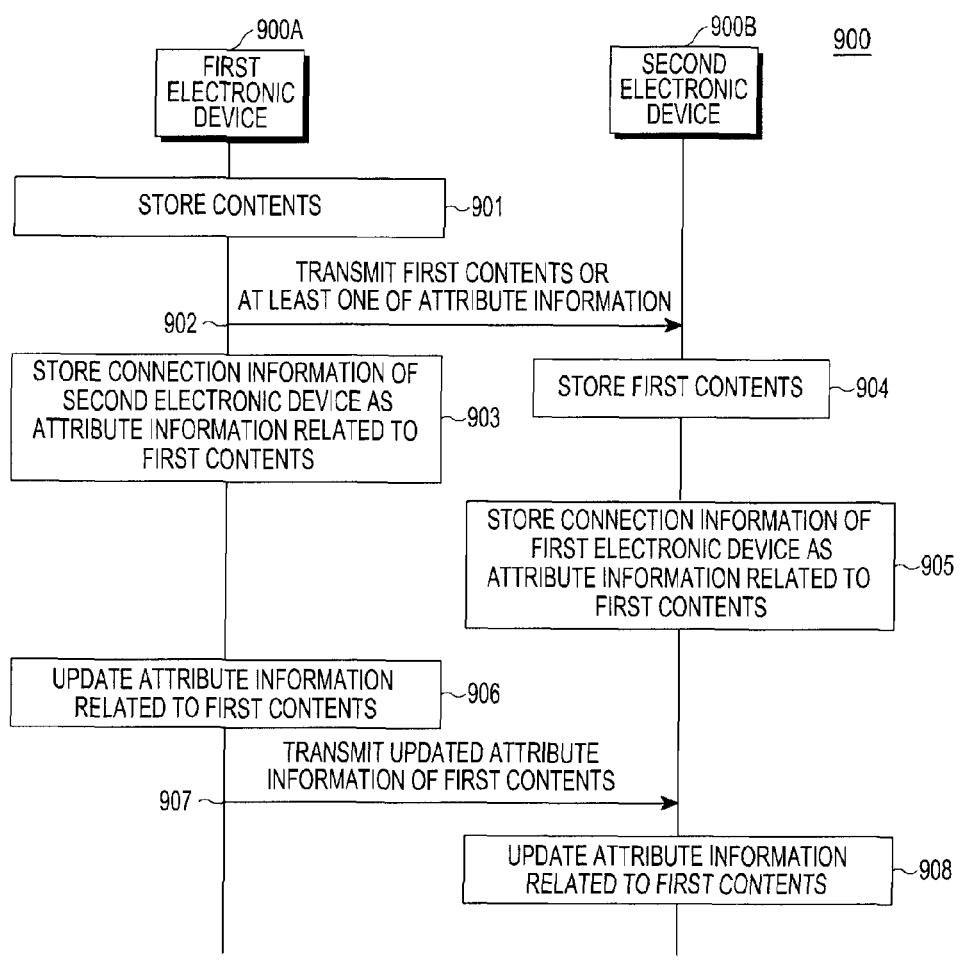
FIG. 9 is a flow diagram illustrating a method of controlling an update of attribute information of contents according to various embodiments.

FIG. 9 is a flowchart illustrating a method 900 of controlling an update of attribute information of contents according to various embodiments. In the method 900, at least one of a first electronic device 900A (e.g. device 101) and a second electronic device 900B (e.g. server 106) may include, for example, a content control module (e.g. 401) or a storage module (e.g. 420). When attribute information related to contents is updated, the content control module may transmit the updated attribute information to another electronic device having received the contents. In the description below, it is assumed that first device 900A includes a first storage module 420 and second device 800B includes a second storage module 420.

In step 901, the first electronic device 900A may store one or more contents or attribute information related to the one or more contents in the first storage module 420. When the one or more contents stored in the first storage module 420 are one or more contents captured by the first electronic device 900A, the first electronic device 900A may store capture information as attribute information related to the one or more contents. In step 902, according to a user request, the first electronic device 900A may transmit first contents of the one or more contents stored in the first storage module or the attribute information related to the first contents to the second electronic device 900B. The first electronic device 900A may transmit at least one of the attribute information related to the first contents (for example, attribute information having capture information) stored in the first storage module and the connection information of the first electronic device 900A (for example, an ID of the first electronic device or a unique address of the first electronic device) to the second electronic device 900B in step 902. In step 903, the first electronic device 900A may further store connection information of the second electronic device 900B having received the first contents as the attribute information related to the first contents.

In step 904, the second electronic device 900B may store the first contents received from the first electronic device 900A in the second storage module 420 of the second electronic device 900B. (The first contents may have been transmitted to the second device 900B in step 902, or may have been received by the second device 900B previously.) In step 905, the second electronic device 900B may store the connection information of the first electronic device having transmitted the first contents (for example, an ID of the first electronic device or a unique address of the first electronic device) in the second storage module 420 as the attribute information related to the first contents. When the attribute information related to the first contents is received from the first electronic device 900A, the second electronic device 900B may store the received attribute information in the second storage module 420 as the attribute information related to the first contents in step 905. In step 906, the first electronic device 900A may determine an update of the attribute information related to the first contents. In step 907, the first electronic device 900A may transmit the updated attribute information of the first contents to the second electronic device 900B using the attribute information related to the first contents (for example, the connection information of the second electronic device). When the first contents are edited and thus attribute information having edit information related to the first contents are further stored in the first storage module, the first electronic device 900A may transmit the attribute information (for example, edit information) related to the first contents to the second electronic device 900B using the previous attribute information related to the first contents (for example, the connection information of the second electronic device). When the updated attribute information of the first contents is received from the first electronic device 900A, the second electronic device 900B may update the attribute information related to the first contents stored in the second storage module in step 908. Thus, in the example of edited first contents, the second device 900B (and optionally, any other device to which the first contents were previously sent) may be apprised that the first contents has been edited, even without transmitting the edited first contents. The user of the second device 900B may then subsequently send a request for the edited first contents to the first device 900A.

Figure 10:
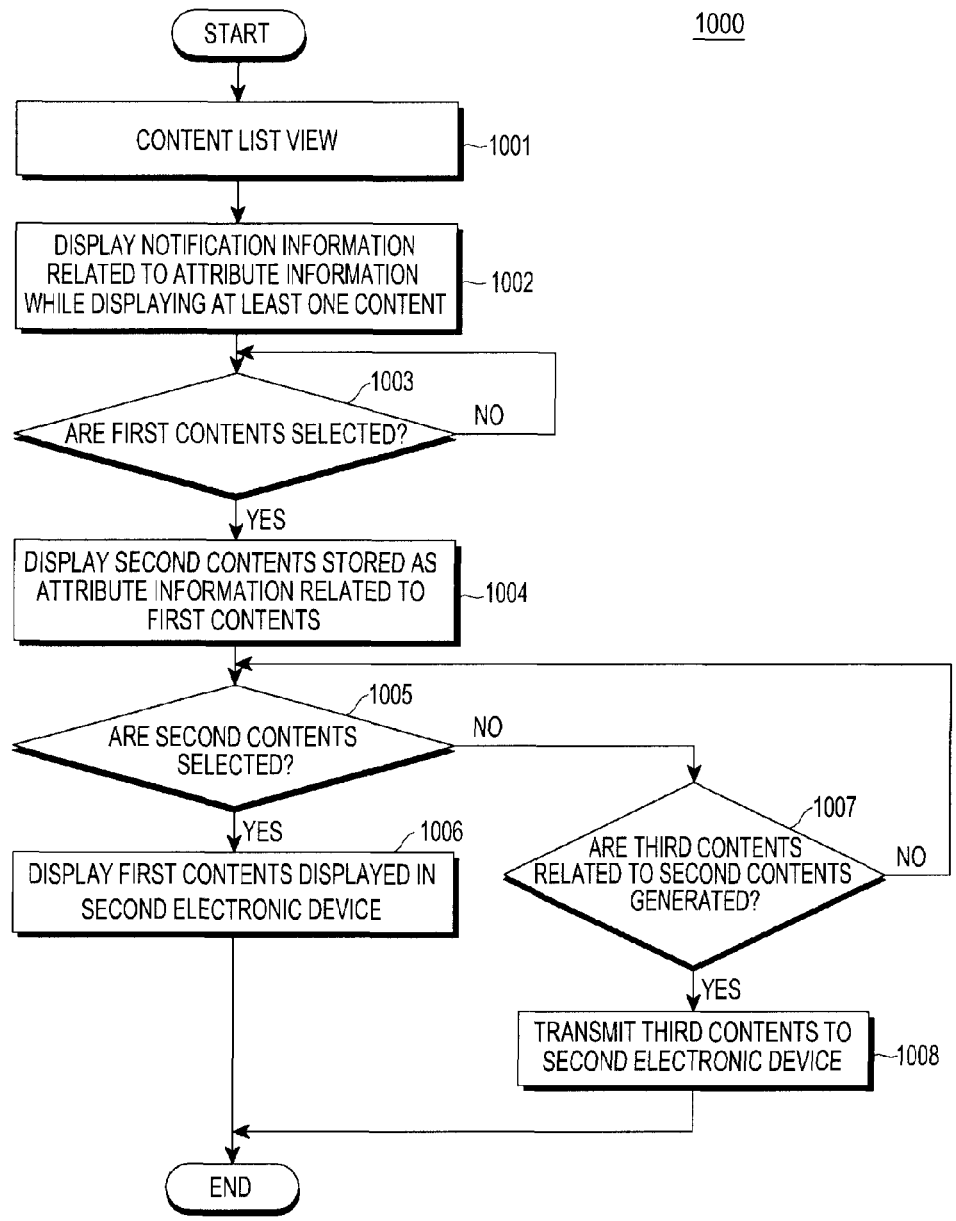
FIG. 10 is a flowchart illustrating a method of controlling a display of contents according to various embodiments.

FIG. 10 is a flowchart illustrating a method 1000 of controlling a display of contents according to various embodiments. With this method, a first electronic device 101 may include, for example, a content control module (e.g. 401) or a storage module (e.g. 420). The content control module may display notification information (for example, an indicator, icon, or color) related to attribute information of one or more contents in at least some areas related to the one or more contents while displaying the one or more contents on a display (for example, the display 260). FIG. 10 illustrates that a first electronic device (e.g. a mobile phone) may receive second contents related to first contents from a second electronic device (e.g. a server), and may transmit a third content related to the second contents to the second electronic device (e.g. the server).

As shown in FIG. 10, in step 1001, the first electronic device may detect a selection of a content list view based on a user input. In step 1002, the first electronic device may display one or more contents stored in the second storage module 420 of the first electronic device on the display. In this step, the first electronic device may also determine if detect one or more first contents storing related attribute information from the one or more contents. The first electronic device may display notification information (for example, an indicator, icon, or color) related to the detected one or more first contents in at least some areas of the display which displays the detected one or more first contents. In step 1003, the first electronic device may determine that first contents are selected from one or more detected first contents based on a user input. When the first electronic device determines that the first contents are selected in step 1003, the first electronic device may display one or more second contents stored as attribute information related to the first contents while displaying the first contents in step 1004. For example, the first electronic device may display the second contents received in real time. (Alternatively, when the second device does not provide the second contents but the second contents are available from the first device, when the first contents are selected, the first electronic device may make a request for the second contents to the second electronic device having transmitted the first contents, in order to receive the second contents.)

In step 1005, when the second contents are provided by the second device and not the first device, the first electronic device may determine that the second contents are selected while displaying the first contents and the one or more second contents based on a user input. When the first electronic device determines that the second contents are selected in step 1005, the first electronic device may be connected to the second electronic device using attribute information (for example, connection information of the second electronic device) related to the first contents in step 1006. In step 1006, the first electronic device may display a state of first contents, which are being displayed to be shared on a second electronic device, on the display of the first electronic device. That is, in step 1006, the first electronic device may display a status indicating that the first contents are shared and displayed in a second electronic device.

In step 1007, the first electronic device may determine that third contents related to the second contents are generated based on a user input. When the first electronic device determines that the third contents are generated in step 1007, the first electronic device may transmit the third contents to the second electronic device using attribute information (for example, connection information of the second electronic device) related to the first contents in step 1008. In step 1008, the first electronic device may store the third contents or at least one piece of the connection information of the second contents in the first storage module as the attribute information related to the first contents.

FIGS. 11A to 11G illustrate respective examples of controlling a display of contents on an electronic device according to various embodiments. In the examples of FIGS.

Figure 11A:
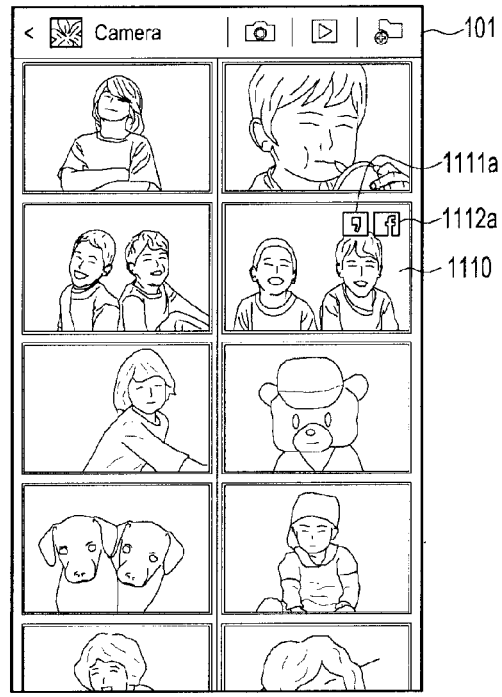
FIG. 11A, FIG. 11B, FIG. 11C, FIG. 11D, FIG. 11E, FIG. 11F and FIG. 11G illustrate respective examples of controlling a display of contents according to various embodiments.
Figure 11B:
Figure 11C:
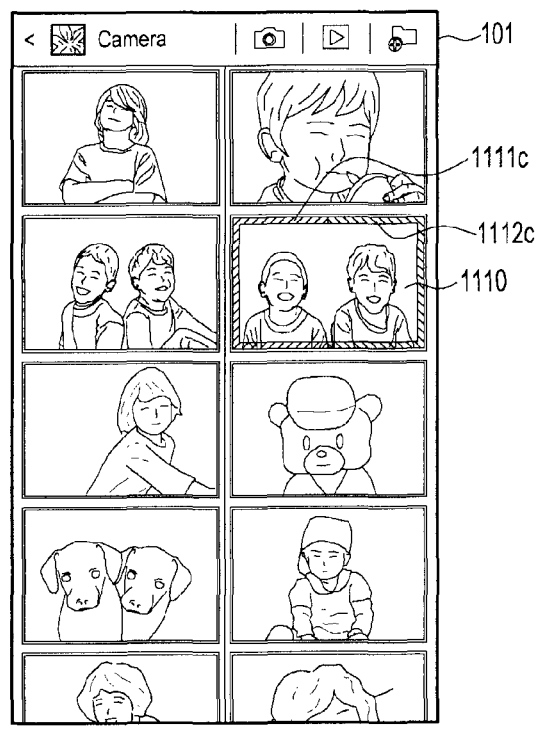
Figure 11D:
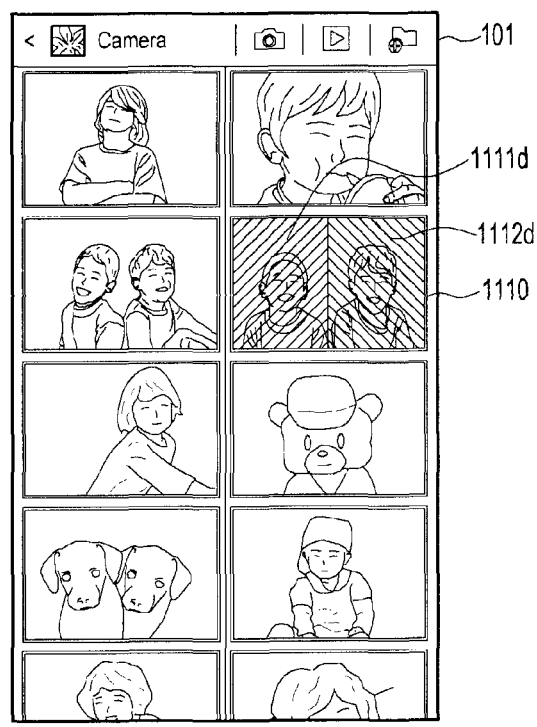

11A-11D, a visual indication is used in association with particular contents to indicate that attribute information of a SNS or the like is associated with those contents. Referring to FIG. 11A, while displaying one or more contents according to selection of a content list content, an electronic device 101 may display an icon 1111a indicating a first SNS, Kakao Story® and an icon 1112a indicating a second SNS, Facebook® superposed with first image contents 1110 having connection information of a server of Kakao Story® and a server of Facebook® as attribute information. These icons indicate to the user that the image contents were previously uploaded to (or received from) the respective service. Of course, the names Facebook® and Kakao® are used herein as examples for easy recognition of a social media service; any suitable uploading/downloading service or external device may be substituted. In another display control method, referring to FIG. 11B, while displaying the one or more contents, electronic device 101 may display a text indication 1111b indicating Kakao Story® and a text indication 1112b indicating Facebook® superposed with the first image contents 1110. Referring to FIG. 11C, in yet another approach, while displaying the one or more contents, the first electronic device may display a color 1111c recognizable as associated with a first SNS and a second, different color 1112c recognizable as associated with a second SNS r in a predetermined part (for example, edge area) of an area displaying the first image contents 1110. Referring to FIG. 11D, in still another approach, while displaying the one or more contents, the first electronic device may display a color 1111d recognizable as associated with a first SNS and a color 1112d recognizable as associated with a second SNS in an area displaying the first image contents 1110 (e.g., superposed with the image so that the relevant portion of the image is tinted with the color).

Figure 11E:
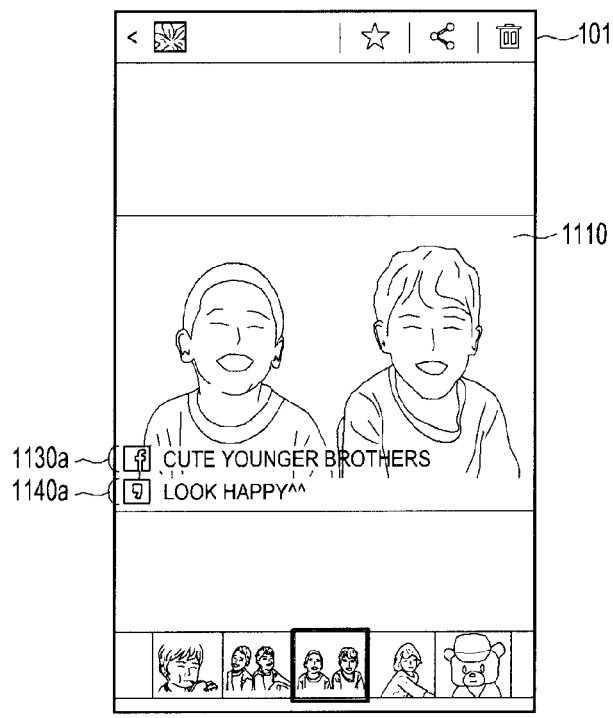
Figure 11F:
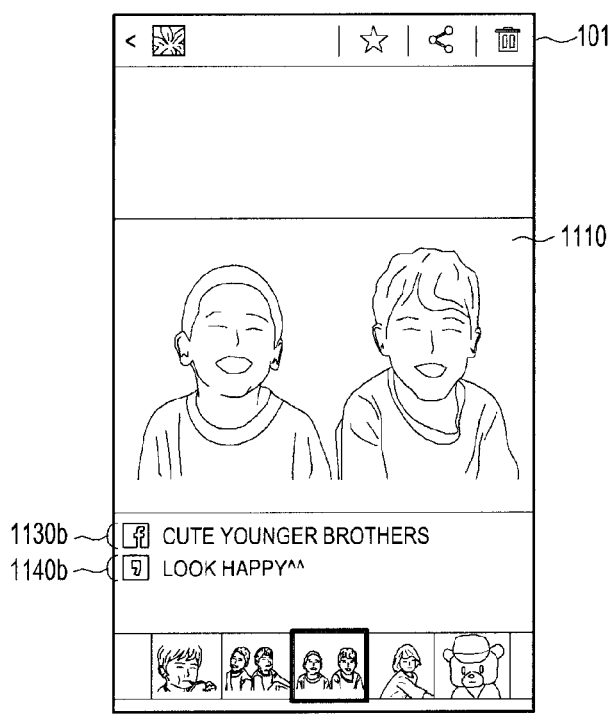
Figure 11G:

Referring to FIG. 11E. when the first image contents 1110 are selected in any of FIGS. 11A to 11D, the electronic device 101 may display a reply 1130a (e.g., in the form of a text description) to the first image contents uploaded to the server of Facebook and a reply 1140a to the first image contents uploaded to the server of Kakao story in the area superposed with the first image contents 1110. Referring to FIG. 11F, in another approach, the first electronic device may display a reply 1130b to the first image contents uploaded to the server of Facebook and a reply 1140b to the first image contents uploaded to the server of Kakao story in areas other than an area currently displaying the first image contents 1110. Referring to FIG. 11G, when the reply 1130a or 1130b to the first image contents uploaded to the Facebook® server is selected in FIG. 11E or 11F (e.g. via touch input on the reply text), the first electronic device may automatically access the Facebook® server using attribute information (for example, connection information of Facebook) related to the first image contents and display the first image contents 1110 which are being displayed on the display (for example, the display 260) of the first electronic device to be shared through the Facebook® server.

Figure 12:
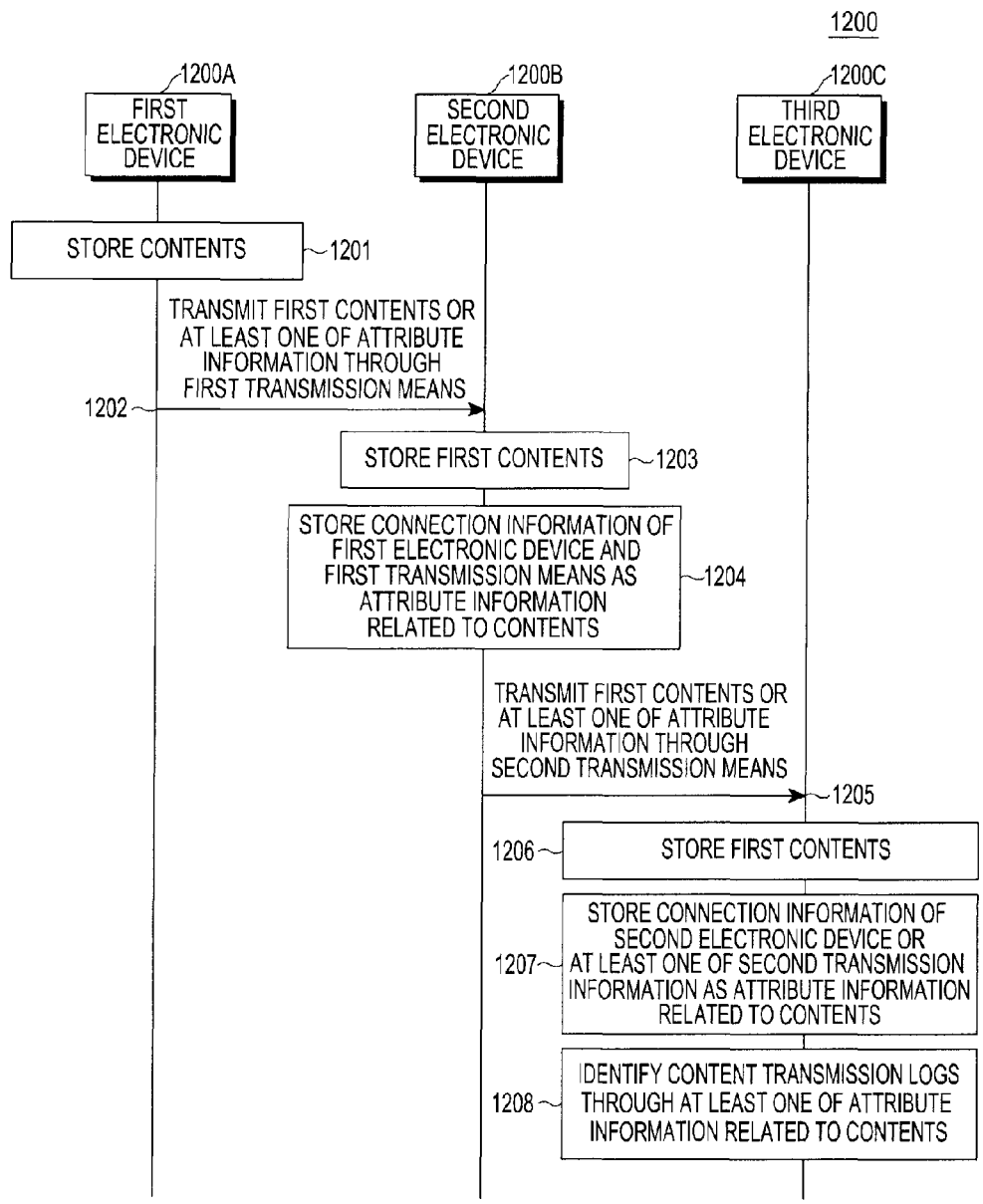
FIG. 12 is a flow diagram illustrating a method of controlling content log identification according to various embodiments.

FIG. 12 is a flow diagram illustrating a method of controlling content log identification according to various embodiments. At least one of a first electronic device 1200A (e.g. the electronic device 101), a second electronic device 1200B (e.g. the server 106), and a third electronic device 1200C (e.g. electronic device 102 or 104) may include, for example, a content control module (e.g. 410) and a storage module (e.g. 420). The content control module may identify transmission stories of one or more contents received from other electronic devices using attribute information of the one or more contents and display the identified transmission logs on a display (e.g. 260).

In step 1201, the first electronic device 1200A may store one or more contents or attribute information related to the one or more contents in a first storage module of the first electronic device 1200A. When the one or more contents stored in the first storage module are one or more contents captured by the first electronic device 1200A, the first electronic device 1200A may store capture information as the attribute information related to the one or more contents. In step 1202, according to a user request, the first electronic device 1200A may transmit at least one of first contents of the one or more contents stored in the first storage module and the attribute information related to the first contents to the second electronic device 1200B using a first transmission means (for example, an MMS). The first electronic device 1200A may transmit at least one of the attribute information related to the first contents (for example, attribute information having capture information) stored in the first storage module and the connection information of the first electronic device 1200A (for example, an ID of the first electronic device or a unique address of the first electronic device) to the second electronic device 1200B in step 1202. The first electronic device 1200A may further store at least one of connection information (for example, a Uniform Resource Locator (URL), an ID of the second electronic device, or a unique address of the second electronic device) of the second electronic device 1200B having transmitted the first contents and information of the first transmission means (for example, an MMS) in the storage module as the attribute information related to the first contents.

In step 1203, the second electronic device 1200B may store the first contents received from the first electronic device 1200A in a second storage module 420 of the second electronic device 1200B. In step 1204, the second electronic device 1200B may store the connection information of the first electronic device 1200A having transmitted the first contents (for example, an ID of the first electronic device or a unique address of the first electronic device) in the second storage module as the attribute information related to the first contents. In step 1204, the second electronic device 1200B may store the attribute information related to the first contents received from the first electronic device 1200A in a second storage module.

In step 1205, according to a user request, the second electronic device 1200B may transmit at least one of the first contents stored in the second storage module and the attribute information related to the first contents to a third electronic device 1200C using a second transmission means (for example, a messenger). The first electronic device 1200B may transmit at least one of the attribute information related to the first contents stored in the second storage module and the connection information of the second electronic device 1200B (for example, an ID of the second electronic device or a unique address of the first electronic device) to the third electronic device 1200C in step 1205. The second electronic device 1200B may further store at least one of connection information (for example, a Uniform Resource Locator (URL), an ID of the third electronic device, or a unique address of the third electronic device) of the third electronic device 1200C having transmitted the first contents and the second transmission means (for example, a messenger) in the storage module as the attribute information related to the first contents.

In step 1206, the third electronic device 1200C may store the first contents received from the second electronic device 1200B in a third storage module of the third electronic device 1200C. In step 1207, the third electronic device 1200C may store the connection information of the second electronic device having transmitted the first contents (for example, an ID of the second electronic device or a unique address of the second electronic device) in the third storage module as the attribute information related to the first contents. When the attribute information related to the first contents is received from the second electronic device 1200B, the third electronic device 1200C may store the received attribute information in the third storage module as the attribute information related to the first contents in step 1207. In step 1208, when a request for identifying transmission logs of the first contents is made based on a user input, the third electronic device 1200C may identify the transmission logs of the first contents using one or more pieces of attribute information related to the first contents stored in the third storage module and display the identified transmission logs on a display 260. For example, it is the transmission logs convey that the contents are captured by and stored in the first electronic device 1200A, stored in the second electronic device 1200B through the first transmission means (for example, an MMS), and transmitted to the third electronic device 1200C from the second electronic device 1200B through the second transmission means (for example, a messenger).

Figure 13:
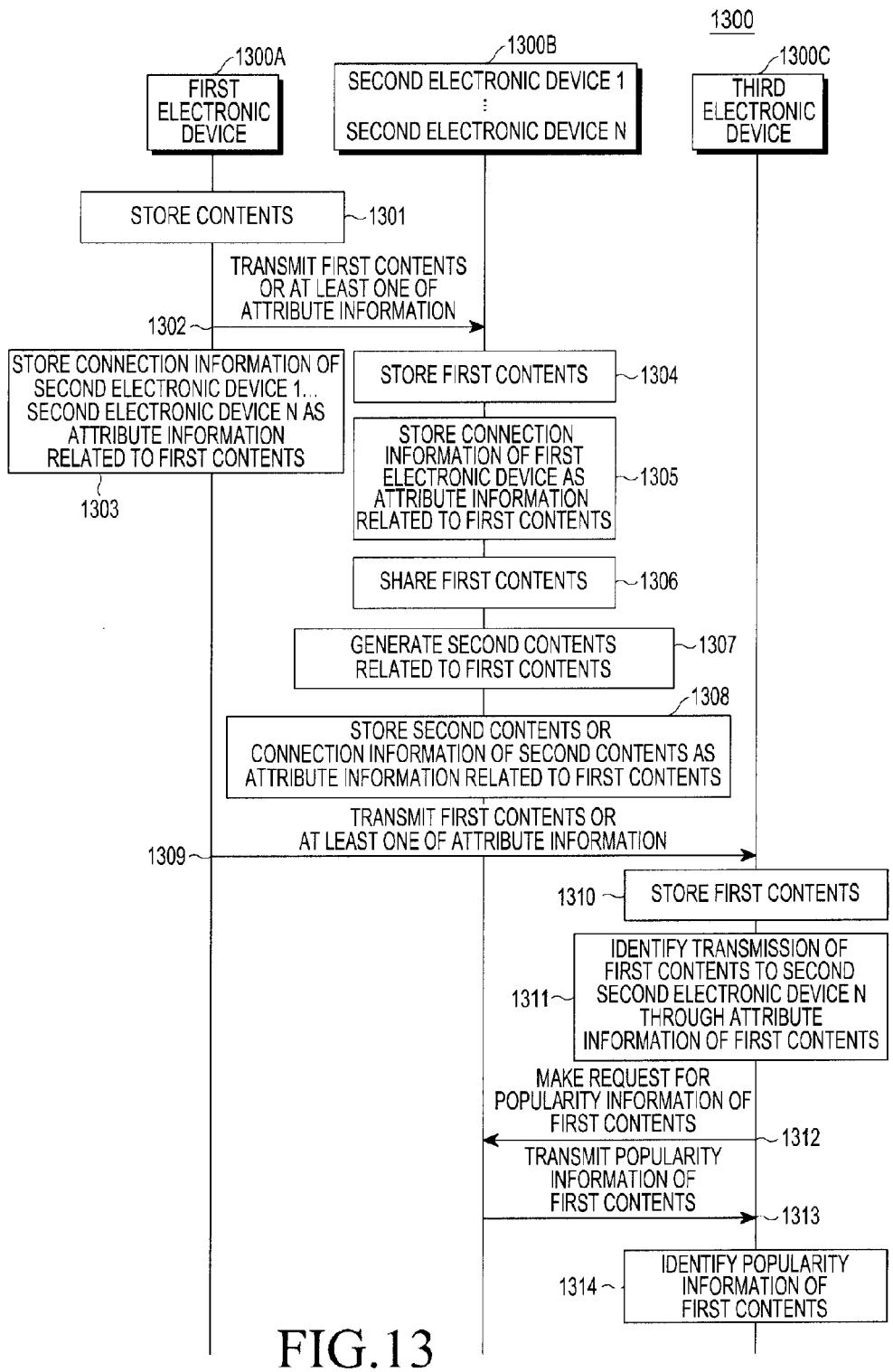
FIG. 13 is a flow diagram illustrating a method of controlling content-related information identification according to various embodiments.

FIG. 13 is a flowchart illustrating a method 1300 of controlling content-related information identification according to various embodiments. At least one of a first electronic device 1300A (the electronic device 101), a second electronic device 1300B (for example, the server 106), and a third electronic device 1300C (e.g. the electronic device 102 or 104) may include, for example, a content control module (e.g. 410) or a storage module (e.g. 420). The content control module may identify related information (for example, popularity information) of one or more contents received from other electronic device(s) using attribute information related to the one or more contents.

In step 1301, the first electronic device 1300A may store one or more contents and attribute information related to the one or more contents in a first storage module of the first electronic device 1300A. In step 1302, according to a user request, the first electronic device 1300A may transmit at least one of first contents of the one or more contents stored in the first storage module and the attribute information related to the first contents to one or more second electronic devices 1300B (labeled as second electronic devices 1 to N). The first electronic device 1300A may transmit at least one of the attribute information related to the first contents stored in the first storage module and information of the first electronic device 1300A (for example, an ID of the first electronic device or a unique address of the first electronic device) to the one or more second electronic devices 1300B in step 1302. In step 1303, the first electronic device 1300A may further store connection information of the one or more second electronic devices 1300B to which the first contents were transmitted (for example, a URL, an ID of the second electronic device, or a unique address of the second electronic device) in the first storage module as the attribute information related to the first contents.

In step 1304, the one or more second electronic devices 1300B may each store the first contents received from the first electronic device 1300A in their respective second storage modules. In step 1305, the one or more second electronic devices 1300B may store the connection information of the first electronic device having transmitted the first contents (for example, an ID of the first electronic device or a unique address of the first electronic device) in the second storage module as the attribute information related to the first contents. In step 1305, the one or more second electronic devices 1300B may store the attribute information related to the first contents received from the first electronic device 1300A in the second storage modules.

In step 1306, the one or more second electronic devices 1300B may display and share the first contents provided by the first electronic device 1300A. In step 1307, the one or more second electronic devices 1300B may determine that second contents related to the first contents are generated while displaying the first contents. In step 1308, the one or more second electronic devices 1300B may store the second contents or at least one piece of connection information of the second contents in the second storage module as the attribute information related to the first contents.

In step 1309, according to a user request, the first electronic device 1300A may transmit at least one of the first contents stored in the first storage module and the attribute information related to the first contents to the third electronic device 1300C. In step 1309, the first electronic device 1300A may transmit at least one of the attribute information related to the first contents stored in the first storage module, the connection information (for example, a ULR, IDs of the one or more second electronic devices, or unique addresses of the one or more second electronic devices) of the one or more second electronic devices 1300B having received the first contents, and the connection information (for example, an ID of the first electronic device or a unique address of the first electronic device) of the first electronic device 1300A to the third electronic device 1300C. The first electronic device 1300A may further store connection information of the third electronic devices 1300C having received the first contents (for example, a URL, IDs of one or more third electronic devices, or unique addresses of one or more third electronic devices) in the first storage module as the attribute information related to the first contents.

In step 1310, the third electronic device 1300C may store the first contents received from the first electronic device 1300A in a third storage module of the third electronic device 1300C. In step 1310, the third electronic device 1300C may store the connection information of the first electronic device having transmitted the first contents (for example, an ID of the first electronic device or a unique address of the first electronic device) in the third storage module. When the attribute information related to the first contents is received from the first electronic device 1300A, the third electronic device 1300C may store the received attribute information in the third storage module as the attribute information related to the first contents in step 1310. In step 1311, the third electronic device 1300C may identify the connection information of the one or more second electronic devices 1300B having received the first contents using the attribute information related to the first contents and provide the identified connection information to a user of the third electronic device 1300C. In step 1312, the third electronic device 1300C may make a request for information related to the first contents, for example, popularity information to the one or more second electronic devices 1300B using the attribute information of the first contents (for example, connection information of the one or more second electronic devices) based on a user input. In step 1313, the one or more second electronic devices 1300B may detect popularity information of the first contents (for example, the number of hits, the number of replies, or the number of "Likes") according to a request from the third electronic device 1300C and transmit the detected popularity information to the third electronic device 1300C. In step 1314, the third electronic device 1300C may display the popularity information of the first contents received from the one or more second electronic devices 1300B on a display (for example, the display 260).

Figure 14:
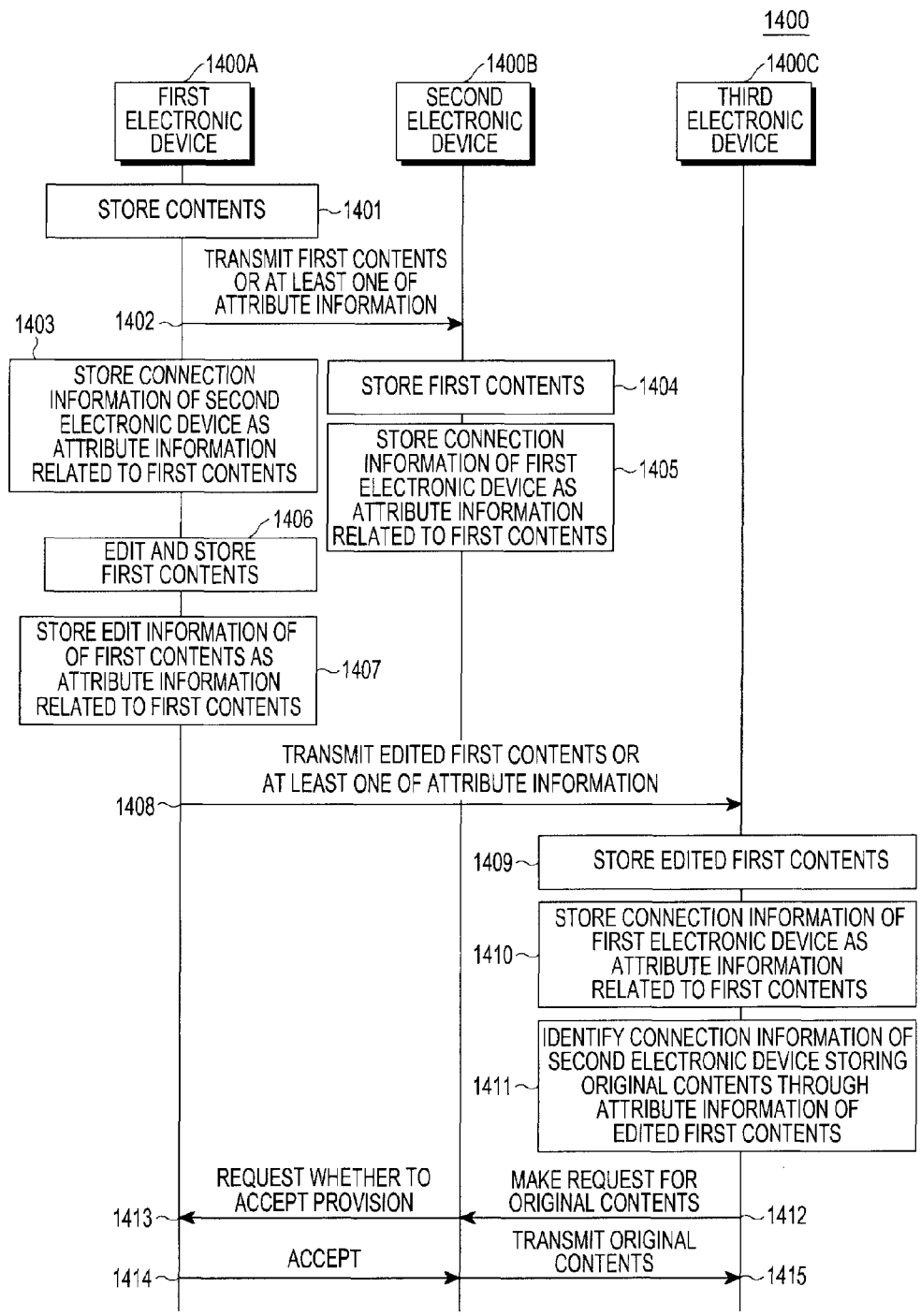
FIG. 14 is a flow diagram illustrating a method of controlling a content-related information request according to various embodiments.

FIG. 14 is a flow diagram illustrating a method 1400 of controlling a content-related information request according to various embodiments. Here, at least one of a first electronic device 1400A (e.g. the electronic device 101), a second electronic device 1400B (e.g. the server 106), and a third electronic device 1400C (e.g. device 102 or 104) may include, for example, a content control module (e.g. 410) and a storage module (e.g. 420). The content control module may identify related information (for example, original) of one or more contents received from other electronic devices using attribute information related to the one or more contents.

In step 1401, the first electronic device 1400A may store one or more contents and attribute information related to the one or more contents in a first storage module of the first electronic device 1400A. In step 1402, according to a user request, the first electronic device 1400A may transmit first contents of the one or more contents stored in the first storage module or the attribute information related to the first contents to one or more second electronic devices 1400B. The first electronic device 1400A may transmit at least one of the attribute information related to the first contents stored in the first storage module and the connection information of the first electronic device 1400A (for example, an ID of the first electronic device or a unique address of the first electronic device) to the one or more second electronic devices 1400B in step 1402. In step 1403, the first electronic device 1400A may further store connection information of the second electronic device 1400B having received the first contents in the first storage module as the attribute information related to the first contents.

In step 1404, the second electronic device 1400B may store the first contents received from the first electronic device 1400A in a second storage module of the second electronic device 1400B. When the attribute information related to the first contents is received from the first electronic device 1400A, the second electronic device 1400B may store the received attribute information in the second storage module as the attribute information related to the first contents in step 1405.

In step 1406, when the first electronic device 1400A determines that the first contents are edited based on a user input, the first electronic device 1400A may store the edited first contents in the first storage module. In step 1407, the first electronic device 1400A may store edit information on the first contents in the first storage module as the attribute information related to the first contents. In step 1408, according to a user request, the first electronic device 1400A may transmit at least one of the edited first contents stored in the first storage module and the attribute information related to the first contents to the third electronic device 1400C. The first electronic device 1400A may transmit at least one of the attribute information related to the first contents stored in the first storage module and information of the first electronic device 1400A (for example, an ID of the first electronic device or a unique address of the first electronic device) to the third electronic device 1400C in step 1408. The first electronic device 1400A may further store connection information of the third electronic device 1400C having received the first contents in the storage module as the attribute information related to the first contents.

In step 1409, the third electronic device 1400C may store the first contents received from the first electronic device 1400A in a third storage module of the third electronic device 1400C. The third electronic device 1400 1300C may store the attribute information related to the first contents received from the first electronic device 1400A in the third storage module as the attribute information related to the first contents in step 1410. In step 1411, the third electronic device 1400C may identify connection information of the second electronic device 1400B having received the information edited from the first contents and original contents of the first contents and provide the identified connection information to a user of the third electronic device 1400C. In step 1412, the third electronic device 1400C may make a request for the original contents of the first contents to the second electronic device 1400B using the attribute information of the first contents (for example, connection information of the second electronic device) based on a user input. In step 1413, the second electronic device 1400B may transmit, to the first electronic device 1400A, a message requesting whether to accept the provision of the original contents of the first contents to the third electronic device 1400C. In step 1414, the second electronic device 1400B may receive, from the first electronic device 1400A, a message accepting the provision of the original contents of the first contents to the third electronic device 1400C. In step 1415, the second electronic device 1400B may provide the original contents of the first contents to the third electronic device 1400C.

According to various embodiments, a method of controlling contents by an electronic device may include an operation for transmitting the contents to at least one other electronic device, and an operation for storing log information recorded in connection with access to the contents by the electronic device or the at least one other electronic device as attribute information (metadata) related to the contents.

According to various embodiments, a method of controlling contents by an electronic device may include an operation for receiving contents from one or more other electronic devices, and an operation for identifying logs recorded in connection with access to the contents by the one or more other electronic devices.

According to various embodiments, a method of controlling contents by an electronic device may include an operation for receiving contents from at least one other electronic device, and an operation for storing log information recorded in connection with access to the contents by the electronic device or the at least one other electronic device as attribute information (metadata) related to the contents.

The embodiments disclosed in this document are only for the description and the understanding of technical contents and do not limit the scope of the claimed subject matter as defined by appended claims. Accordingly, the scope of the claimed subject matter should be construed as including all modifications or various other embodiments based on the technical idea of the present disclosure.

What is claimed is:
1. An electronic device comprising:
a communication module;
a first storage module;
a first display; and
a first processor configured to:
transmit, via the communication module, content stored in the first storage module to a server in communication with a plurality of external devices, store connection information with the server in the first storage module as a first attribute information associated with the content, receive, via the communication module, log information from the server, the log information related to access of the content by at least one of the plurality of external devices, store the log information in the first storage module as a second attribute information associated with the content, display, on the first display, the content from the first storage module and one or more indicators indicating the second attribute information and service information associated with the server overlapping at least a portion of the content, and in response to receiving a selection input of the one or more indicators, access, via the communication module, the server using the first attribute information to display, on the first display, the content retrieved from the server, wherein one of the plurality of external devices comprises:

a second storage module;

a second display; and a second processor configured to:

receive the content and the first attribute information from the electronic device or the server and store the content and the first attribute information in the second storage module, store, in the second storage module, connection information with the electronic device or the server as a fourth attribute information, and using the first and fourth attribute information, identify transmission log information associated with the content.

2. The electronic device of claim 1, wherein the content include at least one of an image, text, audio data and video.

3. The electronic device of claim 1, wherein the log information includes at least one of capture information, edit information, share information, and transmission information, wherein the capture information includes an identification of a device that performed the capture, the edit information includes an identification of a device that performed the edit, the share information includes an identification of a share service, and the transmission information includes an identification of a transmission service.

4. The electronic device of claim 1, wherein the server comprises a cloud server, a social media server, or a web server.

5. The electronic device of claim 1, wherein the first processor stores the content such that the first and/or second attribute information are included as a part of the content.

6. The electronic device of claim 1, wherein the content is a first content, and the first processor controls to display the first content and/or a second content received in relation to the first content from the server on the first display.

7. The electronic device of claim 1, wherein the first processor further receives other log information or other content from the server or the plurality of external devices, wherein the other log information or the other content are associated with the content using the second attribute information.

8. The electronic device of claim 7, wherein the first processor stores the other log information or the other content as a third attribute information associated with the content.

9. The electronic device of claim 1, wherein the first processor transmits at least some of the first or second attribute information or additional attribute information to the server separately from the content or as a part of the content.

10. The electronic device of claim 1, wherein the first processor transmits updated attribute information associated with the content to the server.

11. The electronic device of claim 1, wherein the first processor displays the one or more indicators to distinguish the content from other content while displaying a content list including the content and the other content.

12. The electronic device of claim 8, wherein the first processors displays the other log information or the other content while concurrently displaying the content.

13. The electronic device of claim 1, wherein the second processor transmits a request for additional information related to the content, and receives the additional information related to the content.

14. The electronic device of claim 13, wherein the additional information includes a popularity information related to the content.

15. The electronic device of claim 1, wherein the server comprises:

a third storage module;

a communication unit; and a third processor configured to:

control the communication unit to communicate with the electronic device and the plurality of external devices, receive the content from the electronic device, identify the log information related to the access of the content by at least one of the plurality of external devices, store the log information in the third storage module as the second attribute information associated with the content, and transmit the log information to the electronic device.

16. The electronic device of claim 15, wherein the third processor stores the content such that the second attribute information is included as a part of the content.

17. The electronic device of claim 15, wherein the third processor receives a request for particular information related to the content from one of the plurality of external devices, detects the particular information, and transmits the detected particular information to the one of the plurality of external devices.

18. The electronic device of claim 17, wherein the particular information includes a popularity information related to the content.

19. The electronic device of claim 15, wherein the third processor updates the first or second attribute information of the content based on updated attribute information associated with the content received from the electronic device or at least one of the plurality of external devices.

20. The electronic device of claim 15, wherein the third processor stores other content associated with the content received from the electronic device or at least one of the plurality of external devices as a fifth attribute information.

21. A method of controlling content by an electronic device, the method comprising:

transmitting the content to a server in communication with a plurality of external devices;

storing connection information with the server as a first attribute information associated with the content;

receiving log information from the server, the log information related to access of the content by at least one of the plurality of external devices;

storing the log information as a second attribute information associated with the content;

displaying the content and one or more indicators indicating the second attribute information and service information associated with the server overlapping at least a portion of the content;

receiving a selection input of the one or more indicators;

in response to receiving the selection input, accessing the server using the first attribute information; and in response to accessing the server, displaying the content retrieved from the server wherein one of the plurality of external devices performs:

receiving the content and the first attribute information from the electronic device or the server and storing the content and the first attribute information;

storing connection information with the electronic device or the server as a third attribute information; and using the first and third attribute information, identifying transmission log information associated with the content.

22. The method of claim 21, wherein the server performs: establishing communication with the electronic device and the plurality of external devices; receiving the content from the electronic device; identifying the log information related to the access of the content by at least one of the plurality of external devices;

storing the log information as the second attribute information associated with the content; and transmitting the log information to the electronic device.

* * * * *